United States Patent
Kurihara et al.

(10) Patent No.: US 7,277,140 B2
(45) Date of Patent: Oct. 2, 2007

(54) IMAGE SHIFTING DEVICE, IMAGE DISPLAY, LIQUID CRYSTAL DISPLAY, AND PROJECTION IMAGE DISPLAY

(75) Inventors: Takashi Kurihara, Nara (JP); Yasuhiro Kume, Osaka (JP); Hiroshi Nakanishi, Kyoto (JP); Kazuhiko Tamai, Mie (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 226 days.

(21) Appl. No.: 10/496,802

(22) PCT Filed: Nov. 28, 2002

(86) PCT No.: PCT/JP02/12462

§ 371 (c)(1),
(2), (4) Date: May 27, 2004

(87) PCT Pub. No.: WO03/046652

PCT Pub. Date: Jun. 5, 2003

(65) Prior Publication Data
US 2005/0105016 A1    May 19, 2005

(30) Foreign Application Priority Data

| Nov. 28, 2001 | (JP) | ............................ | 2001-361976 |
| Apr. 25, 2002 | (JP) | ............................ | 2002-124664 |
| May 31, 2002 | (JP) | ............................ | 2002-159795 |
| Jul. 22, 2002 | (JP) | ............................ | 2002-211932 |

(51) Int. Cl.
*G02F 1/1335* (2006.01)
*G02F 1/1333* (2006.01)

(52) U.S. Cl. ................. 349/96; 349/5; 349/84

(58) Field of Classification Search ............... 349/5, 349/84, 96, 180, 155
See application file for complete search history.

(56) References Cited

U.S. PATENT DOCUMENTS

| 4,984,091 | A |   | 1/1991 | Murata |
| 5,659,411 | A | * | 8/1997 | Nito et al. ................. 349/117 |
| 5,699,133 | A |   | 12/1997 | Furuta |
| 6,061,103 | A | * | 5/2000 | Okamura et al. ........... 348/767 |

(Continued)

FOREIGN PATENT DOCUMENTS

EP    634685 A    1/1995

(Continued)

*Primary Examiner*—Mike Qi
(74) *Attorney, Agent, or Firm*—Birch, Stewart, Kolasch & Birch, LLP

(57) ABSTRACT

The invention provides an image shifting device including at least one image shifting part for periodically shifting the position of an optical axis. The image shifting part includes a liquid crystal device 10 for switching a polarization direction of light between two orthogonal directions in accordance with High/Low level of an applied voltage, and a birefringent device 11 having different refractive indexes depending upon the polarization direction of the light. The liquid crystal device 10 and the birefringent device 11 are disposed to transmit light in this order. A liquid crystal layer included in the liquid crystal device 10 is made of a TN liquid crystal layer that satisfies a relationship formula of $0.25 < d/p < 1$, wherein a natural pitch length is indicated by $p$ and a cell gap is indicated by $d$, and is disposed to be twisted at 90° within the liquid crystal cell.

17 Claims, 27 Drawing Sheets

U.S. PATENT DOCUMENTS

| | | | |
|---|---|---|---|
| 6,188,382 B1 * | 2/2001 | Okamura et al. | 345/669 |
| 6,304,381 B1 * | 10/2001 | Hayashi | 359/495 |
| 6,600,545 B1 * | 7/2003 | Sugiyama | 349/186 |
| 6,885,412 B2 * | 4/2005 | Ohnishi et al. | 349/72 |

FOREIGN PATENT DOCUMENTS

| | | | |
|---|---|---|---|
| EP | 637771 A | 2/1995 | |
| EP | 751683 A | 1/1997 | |
| JP | 4-278929 | * 10/1992 | |
| JP | 4-278929 A | 10/1992 | |
| JP | 5-181165 A | 7/1993 | |
| JP | 6-265897 A | 9/1994 | |
| JP | 9-22015 A | 1/1997 | |
| JP | 2000-187223 A | 7/2000 | |
| JP | 2000-199901 A | 7/2000 | |
| JP | 2001-109005 A | 4/2001 | |
| JP | 2002-268095 A | 9/2002 | |
| JP | 2002-277902 A | 9/2002 | |

* cited by examiner

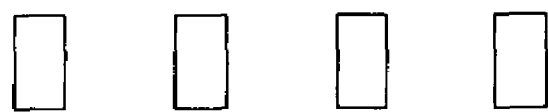
FIG. 5A
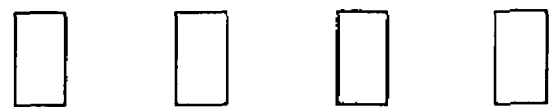
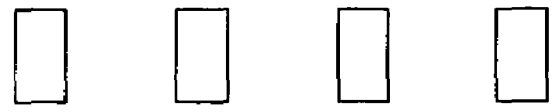
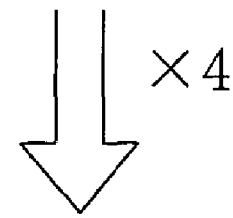
FIG. 5B
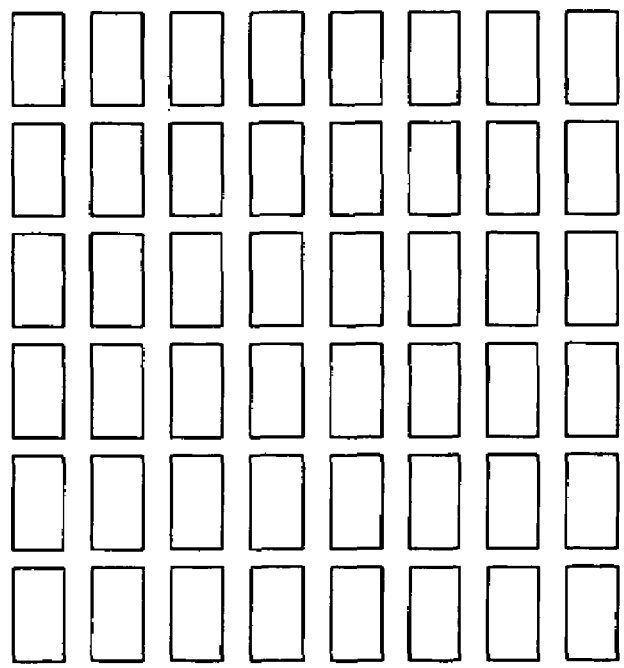

IMAGE SHIFTING DEVICE, IMAGE DISPLAY, LIQUID CRYSTAL DISPLAY, AND PROJECTION IMAGE DISPLAY

CROSS REFERENCE TO RELATED APPLICATIONS

This application is a Section 371 of International Patent Application No. PCT/JP02/12462, filed Nov. 28, 2002, the disclosure of which is incorporated herein by reference.

TECHNICAL FIELD

The present invention relates to an image shifting device, and, more specifically, to an image shifting device suitable for use in a head mount display (hereinafter referred to as the "HMD") or a projection image display apparatus (projector), and an image display apparatus including the image shifting device.

Furthermore, the present invention relates to a liquid crystal display device and a projection image display apparatus including the liquid crystal display device, and, in some embodiments it relates to a liquid crystal display device having a spacer provided between a pair of substrates and a projection image display apparatus including the liquid crystal display device.

Moreover, an embodiment of the present invention relates to a twisted nematic (hereinafter referred to as "TN") liquid crystal display device composed of a pair of opposing substrates each having an alignment film on its inner face and a liquid crystal layer sandwiched between the pair of substrates and made of nematic liquid crystal having a twist angle peculiar to the material within a given range.

BACKGROUND ART

A liquid crystal display device includes a pair of substrates and a liquid crystal layer sandwiched between these substrates. The substrate has a plurality of pixel electrodes regularly arranged in rows and columns (a matrix), and a driving voltage corresponding to an image signal is applied to each of the pixel electrodes. The optical characteristic (such as light transmittance or reflectance) of the liquid crystal layer is changed in each pixel through this voltage application, so that an image or a character can be displayed.

The method for applying an independent driving voltage to each pixel electrode on the substrate is divided into a "simple matrix method" and an "active matrix method".

In the active matrix method, switching elements respectively corresponding to the pixel electrodes are arranged on the substrate. Such a substrate on which these switching elements are arranged is designated as an active matrix substrate. The switching element provided on the active matrix substrate performs switching of an electrical on/off state between the corresponding pixel electrode and a signal line. As such a switching element, a metal-insulator-metal (MIM) device or a thin film transistor (TFT) is suitably used.

The switching element is required to exhibit electric resistance as high as possible in an off-state. When strong light enters a switching element in an-off state, however, the electric resistance of the switching element is lowered so as to cause a leakage current, and hence, there arises a problem that charge stored in the corresponding pixel electrode is discharged. Also, a driving voltage at an appropriate level cannot be applied to the pixel electrode and a desired display operation cannot be executed, resulting in causing a problem that a contrast ratio is lowered because light leaks even in a dark state.

In the case where the liquid crystal display device is of transmission type, in order to solve the above-described problems, a mask layer designated as a black matrix is provided on the active matrix substrate or on a counter substrate opposing the active matrix substrate with the liquid crystal layer sandwiched therebetween. This black matrix reduces the area ratio (aperture ratio) of a pixel aperture. In order to attain high refinement by reducing the area occupied by the black matrix, the switching elements and lines are reduced, but when the switching elements and the lines are reduced, the driving power is lowered and the line resistance is increased disadvantageously. Also, due to restriction of fabrication technology, the switching elements and the lines are difficult to reduce.

For the purpose of attaining high refinement by utilizing a non-display region on a black matrix, U.S. Pat. No. 4,984,091 discloses a technique in which a displayed image is optically shifted by a distance substantially equivalent to a pixel pitch. According to this technique, a corresponding image is displayed in shifted positions of pixels in synchronization with the shift of the pixels. As a result, the apparent number of pixels is increased, and hence, even when a display device with low resolution is used, display similar to that attained by using a highly refined display panel can be produced.

U.S. Pat. No. 6,061,103 discloses a method in which red, green and blue (hereinafter together referred to as the "RGB") pixels are optically successively shifted by using a shifting device so as to simultaneously display shifted pixels. In this method, in a region corresponding to one pixel, the RGB pixels are displayed in a time division manner. As a result, without reducing the pixel pitch on the display panel, the apparent resolution can be increased three times.

Also, U.S. Pat. No. 6,061,103 discloses, as means for optically shifting an image, an image shifting device composed of a combination of a liquid crystal device and a birefringent device. The birefringent device is made from a material in which a refraction direction of light is changed depending upon the polarization direction of the incident light. When the polarization direction of light entering the birefringent device is changed by using the liquid crystal device, the optical axis of light outgoing from the birefringent device can be shifted.

FIG. 1 shows a known image shifting device. This image shifting device includes a liquid crystal device 10 and a birefringent device 11 arranged in a line along a light propagation direction. The liquid crystal device 10 switches the polarization state of incident linearly polarized light between a state where the plane of the vibration of the electric field vector (hereinafter referred to as the "polarization plane") of the linearly polarized light is rotated by 90° and a state where the linearly polarized light is allowed to pass therethrough without rotating the polarization plate. The birefringent device 11 can shift the light in accordance with the direction of the polarization plane of the incident linearly polarized light.

In the image shifting device exemplified in FIG. 1, the electric field vector direction (polarization direction) of light entering the liquid crystal device 10 is vertical to the surface of the drawing. Since the liquid crystal device 10 uses liquid crystal of the TN mode (TN liquid crystal) with positive refractive index anisotropy $\Delta\epsilon$, liquid crystal molecules are twisted by 90° when no voltage is applied through the liquid crystal layer of the liquid crystal device 10 (namely, in a voltage off-state), and therefore, the polarization plane of the incident light is rotated by 90° owing to the optical activity.

On the other hand, when a voltage of a predetermined or higher level is applied through the liquid crystal layer of the liquid crystal device 10 (namely, in a voltage on-state), the orientation of the liquid crystal molecules accord with the direction of the electric field, and therefore, the incident light outgoes with the polarization plane vertical to the surface of the drawing. The birefringent device 11 of this drawing allows light with the polarization plane vertical to the surface of the drawing to pass therethrough but can shift light with the polarization plane parallel to the surface of the drawing.

The liquid crystal device 10 included in the image shifting device shown in FIG. 1 is required to appropriately and rapidly switch, in accordance with the magnitude of the applied voltage, the state of outgoing light between a state for allowing first linearly polarized light to outgo and a state for allowing second linearly polarized light having a polarization plane vertical to that of the first linearly polarized light to outgo.

As described above, in the case where the liquid crystal device uses the TN liquid crystal, the linearly polarized light having entered the liquid crystal device is allowed to outgo as the linearly polarized light with the polarization plane rotated by 90° when no voltage is applied through the TN liquid crystal. However, when a voltage is applied through the TN liquid crystal, the orientation of the liquid crystal molecules is rapidly changed by the electric field, and hence the liquid crystal is transited to the state where the polarization of the incident light is not changed. On the other hand, when the voltage application through the TN liquid crystal is stopped, the liquid crystal molecules are transited (relaxed) to the initial state but merely slowly.

In this manner, the speeds of changing the orientation of the liquid crystal molecules are different between the case where the voltage applied through the liquid crystal layer is changed from Low level (typically, of 0 V) to High level (of, for example, 5 V) and the case where the applied voltage is changed from High level to Low level. In order to evaluate these response speeds, a pair of orthogonal polarizers are disposed in front of and behind the liquid crystal layer so as to measure change with time of light transmittance. FIG. 2 shows the change of transmittance obtained when the applied voltage is changed from Low level to High level and then changed from High level to Low level after a predetermined time has elapsed. At this point, time elapsed from the transmittance lowering from the maximum value to zero is designated as "liquid crystal rise response time $\tau r$" and time elapsed from the transmittance increasing from zero to the maximum value is designated as "liquid crystal fall response time $\tau d$". The liquid crystal rise response time $\tau r$ is comparatively short but the fall response time $\tau d$ is comparatively long. When the liquid crystal fall response time $\tau d$ is long, an image cannot be shifted in synchronization with switching timing of an image to be displayed by the image display device. Before describing this problem, an image switching speed of an image display device will be first described.

In general, as a driving method for an image display device, either interlace driving or noninterlace driving is employed. The interlace driving is a display method in which odd lines alone and even lines alone are respectively selected in one field so as to complete one image by using the odd and even fields, and selection time for each field is generally 16.6 milliseconds (60 Hz). On the other hand, the noninterlace driving is a display method in which lines are successively selected regardless of odd lines and even lines of the display device, and selection time for each field is generally 16.6 milliseconds (60 Hz) in the same manner as in the interlace driving. At this point, a field means a period of a vertical portion of an image in either of the interlace driving and the noninterlace driving. In a liquid crystal display device, a scan period including blanking time corresponds to a field period.

In the method described in the aforementioned U.S. Pat. No. 6,061,103, one field period is divided in accordance with the shifted positions of RGB pixels, and different images ("sub-field images") are displayed by the image display device in the respective divided periods (hereinafter referred to as the "sub-field periods"). The sub-field period is approximately 5 milliseconds in this case, and therefore, the image shifting device needs to shift the image at short time intervals of approximately 5 milliseconds. Furthermore, an image should be shifted by the image shifting device in synchronization with switching timing of the sub-fields, and therefore, the image shifting device is required to transit the state in response to the voltage applied to the liquid crystal device simultaneously with the switching of the sub-fields.

In an actual liquid crystal device, however, it is difficult to rapidly transit the state in response to the voltage application. For example, in the TN liquid crystal, as shown in FIG. 2, the rise response time $\tau r$ is comparatively short but the fall response time $\tau d$ is generally several tens milliseconds, which is longer than the selection time for a sub-field.

Such a difference in the response time is caused because the "rise" of the curve shown in FIG. 2 is caused by forcedly orienting the liquid crystal molecules along one direction by applying the voltage through the liquid crystal while the "fall" thereof is caused by naturally relaxing the orientation of the liquid crystal molecules to the initial state by stopping the voltage application through the liquid crystal.

When such liquid crystal having the long fall response time $\tau d$ is used, there arises a problem that polarization cannot be appropriately switched. Referring to FIG. 1, this problem will be described. As shown in FIG. 1, when the voltage application to the liquid crystal device (liquid crystal cell) 10 is changed from an on-state to an off-state, the polarization plane of the light outgoing from the liquid crystal device 10 is rotated by 90°, and as a result, the optical axis of the light outgoing from the birefringent device 11 is shifted from a position B to a position A. At this point, if the fall response time $\tau d$ is too long, the linearly polarized light is changed into elliptically polarized light at a transient stage of the fall, and therefore, the same images are doubly displayed in both the position A and the position B, resulting in lowering the resolution.

Furthermore, when there is a large difference between the fall response time $\tau d$ and the rise response time $\tau r$, a difference is caused in the generation level of the double image between the shift from the position A to the position B and the reverse shift, and this difference is visually recognized as a flicker.

Japanese Laid-Open Patent Publication No. 2000-199901 describes that, in a TN liquid crystal display apparatus, the liquid crystal response speed attained when the voltage is changed from an on-state to an off-state can be improved by increasing a twist angle peculiar to the liquid crystal by adjusting the concentration of a chiral agent added to the liquid crystal. However, in a liquid crystal display apparatus, when the concentration of the chiral agent is thus increased, the amplitude of the voltage to be applied through the liquid crystal layer in a voltage on-state should be increased than in a conventional technique, but this is practically difficult in consideration of the performance of a semiconductor thin film transistor working as a switching element in a display region. Furthermore, there is another problem that as the twist angle peculiar to the liquid crystal is increased, the state of the liquid crystal attained in a voltage off-state is more unstable, and hence, the twist angle of 90° can be kept for merely a short period of time. Accordingly, the aforementioned technique has not been applied to an actual liquid crystal device.

Moreover, in a liquid crystal display device, when a distance between substrates is varied on a display plane due to deformation of the substrates caused by an external pressure or the like, a threshold voltage is varied, a short-circuit is caused between electrodes of the respective substrates or the orientation of liquid crystal molecules are disturbed, resulting in a problem that good display cannot be produced. Therefore, a method in which spacers (supporting bodies) for keeping constant a distance between the pair of substrates (which is also designated as a cell thickness or a cell gap) are provided between the substrates has been proposed.

As a method for providing spacers between substrates, for example, an organic or inorganic film is formed on a substrate, a resist is applied thereon, and the resist is subjected to mask exposure, development and etching, so as to form the spacers. Alternatively, instead of the photoresist, a photosensitive organic resin such as photosensitive polyimide or photosensitive acrylic resin may be used.

According to this method, a spacer can be formed in an arbitrary place (such as a place outside a pixel region) and a contact face between the substrate and the spacer can be formed in an arbitrary pattern, and hence, this method is good in view of uniformity in the cell thickness, the strength against the external pressure and the display quality. In this method, procedures for forming spacers, forming an alignment film (an orientation controlling film) and a uniaxial orientation treatment (such as a rubbing treatment) are performed in the order of, for example, any of the following orders (a) through (c):

(a) An alignment film is first formed on a substrate, the alignment film is then subjected to the uniaxial orientation treatment and thereafter, spacers are formed on the alignment film.

(b) An alignment film is first formed on a substrate, spacers are then formed on the alignment film and thereafter, the alignment film is subjected to the uniaxial orientation treatment.

(c) Spacers are first formed on a substrate, an alignment film is then formed and thereafter, the alignment film is subjected to the uniaxial orientation treatment.

Among the above-described orders (a) through (c), the order (c) in which the alignment film is formed after forming the spacers is more preferable than the orders (a) and (c) in which the spacers are formed on the alignment film. This is because, in the order (a) or (b), when the spacers are formed by using, for example, a photoresist or a photosensitive organic resin, a diluting solvent, a developer and a repellent used in applying such a material may lower the orientation-regulating force of the alignment film, and hence, it is difficult to attain high display quality.

In the aforementioned method, a spacer can be formed in an arbitrary shape in an arbitrary position, and therefore, as compared with the case where bead spacers are spread, display nonuniformity derived from spread nonuniformity can be avoided. Furthermore, when a spacer is disposed to overlap a mask layer (black matrix) provided in a position outside pixels, lowering of the display quality derived from display of the spacer itself can be prevented. However, since the orientation of the liquid crystal molecules is disturbed in the vicinity of the spacer, light leakage is caused due to an orientation defect region in the vicinity of the spacer, resulting in lowering the contrast ratio.

The lowering of the display quality is particularly serious when the liquid crystal display device is used in a projection image display apparatus. This is because, in a projection image display apparatus, light emitted from a light source and passing through the liquid crystal display device is enlarged and projected on a screen.

As a method for solving the aforementioned problem, a method using a mask layer for covering the spacer itself and a region in the vicinity of the spacer where the light leakage is caused has been proposed. In this method, the region where the light leakage is caused due to the spacer is covered with the mask layer, and therefore, the lowering of the contrast ratio is suppressed.

Also, Japanese Laid-Open Patent Publication No. 2001-109005 discloses a method in which a column-shaped spacer itself is provided with uniaxial orientation, so as to suppress the orientation turbulence in the vicinity of the spacer.

However, when the mask layer for covering the region where the light leakage is caused is formed, the aperture ratio is lowered, and hence, it is disadvantageously difficult to produce bright display.

Furthermore, the method disclosed in Japanese Laid-Open Patent Publication No. 2001-109005 is difficult to employ for mono domain liquid crystal orientation typically of the TN mode. In this method, the orientation of the liquid crystal molecules in the vicinity of the spacer is fixed by the spacer. Therefore, in a liquid crystal display apparatus for producing display in, for example, the TN mode, the liquid crystal molecules are oriented concentrically around the spacer, and some liquid crystal molecules are inclined against the polarization axis of a polarizing plate. This causes light leakage. In order to suppress the occurrence of the light leakage, it is necessary to orient the liquid crystal molecules parallel or orthogonal to the polarization axis, and what is called four-domain orientation should be employed.

Furthermore, a TN liquid crystal display device has a problem that a response speed Doff attained in turning the voltage off is low. In general, with respect to the response speed τoff attained in turning the voltage off, the following approximate equation (1) is widely known, wherein the viscosity of the liquid crystal is indicated by η, the thickness of the liquid crystal layer is indicated by d and the elastic coefficient of the liquid crystal is indicated by K:

$$\tau\text{off} = \eta \cdot d^2/(\tau^2 K) \tag{1}$$

On the basis of this equation, it can be presumed that it is preferred to lower the viscosity η of the liquid crystal or reduce the thickness d of the liquid crystal layer in order to improve the response speed τoff attained in turning the voltage off. Conventionally, a variety of improvements in development of a liquid crystal material with low viscosity or reduction of the thickness of a liquid crystal layer have been examined from this point of view.

Moreover, differently from the above-described method, Japanese Laid-Open Patent Publication No. 2000-199901 discloses that liquid crystal is previously strongly twisted and is placed in a twisted state as a standard state, namely, as a state attained in a power off-state, and further describes that when the voltage is turned off, the liquid crystal positively recovers by its own force from a non-twisted state attained in a power on-state to the twisted state, whereby largely improving the response time attained in turning the voltage off. Also, it describes that the liquid crystal itself rapidly recovers the twisted structure due to the twist peculiar to the material of the liquid crystal after turning off the voltage, and therefore, a back flow can be suppressed, so as to increase the response speed.

The conventional improvement of the response speed attained in turning the voltage off has, however, the following problems:

First, when the response speed attained in turning the voltage off is to be improved on the basis of the equation (1), the viscosity η of the liquid crystal is reduced. However, the liquid crystal has physical property values peculiar to the material of the liquid crystal, such as the viscosity, the elastic coefficient, the dielectric constant, the refractive index and the phase transition temperature, and these physical property values are correlated with one another. Therefore, it is difficult to reduce the viscosity alone of the liquid crystal, and hence, this method cannot attain a sufficient effect.

Furthermore, when the thickness d of the liquid crystal layer is reduced, the improvement in the response speed attained in turning the voltage off can be expected, but the retardation R (R=d·Δn, wherein Δn is the refractive index anisotropy of the liquid crystal) of the liquid crystal layer is reduced, resulting in lowering the light transmittance.

Moreover, when the elastic coefficient K of the liquid crystal is increased, the improvement in the response speed attained in turning the voltage off can be expected, but the elastic coefficient K of the liquid crystal depends upon the chemical structure of the liquid crystal molecule, and hence, it is substantially impossible to set the elastic coefficient K of the liquid crystal independently to a desired value.

In this manner, the improvement in the response speed attained in turning the voltage off on the basis of the equation (1) cannot attain a sufficient effect because of difficulty in improvement of the material with respect to the liquid crystal itself and because of the trade-off relationship between the response speed and the light transmittance with respect to the thickness of the liquid crystal layer.

Also, in the method for improving the response speed attained in turning the voltage off by increasing the twist angle peculiar to the material of the liquid crystal, namely, by reducing the twist pitch peculiar to the material of the liquid crystal, as disclosed in Japanese Laid-Open Patent Publication No. 2000-199901, change of the light transmittance attained under voltage application tends to be rather slow as described in the publication. This tendency is conventionally widely known, and for example, Japanese Laid-Open Patent Publication No. 5-181165 describes that when the twist pitch peculiar to the material of liquid crystal is reduced by increasing the amount of a chiral material to be added, it is necessary to increase the driving voltage for increasing the contrast. Also, Japanese Laid-Open Patent Publication No. 4-278929 has similar description. In this manner, in the method for improving the response speed attained in turning the voltage off by reducing the twist pitch peculiar to the material of liquid crystal, the driving voltage should be increased, and hence, this method is practically difficult to employ in consideration of the performance of a semiconductor transistor or the like working as a switching element.

DISCLOSURE OF THE INVENTION

The present invention was devised in consideration of the aforementioned circumstances, and provides an image shifting device in which the occurrence of a double image derived from a response delay of liquid crystal caused in transition of voltage application from an on-state to an off-state is suppressed, and an image display apparatus using the image shifting device. Another feature of the invention is providing a liquid crystal display device in which lowering of a contrast ratio derived from a spacer is suppressed and bright display can be produced at a high aperture ratio, and a projection image display apparatus including the liquid crystal display device. Still another feature of the invention is providing a TN liquid crystal display device in which contrast is increased without increasing a driving voltage.

The image shifting device of an embodiment of the present invention includes at least one image shifting part for periodically shifting a position of an optical axis, and the image shifting part includes a liquid crystal cell for switching a polarization direction of light between two directions orthogonal to each other in accordance with High/Low level of an applied voltage; and a birefringent device with different refractive indexes depending upon the polarization direction of the light, the liquid crystal cell and the birefringent device are disposed to transmit the light in this order, and a liquid crystal layer included in the liquid crystal cell is made of a TN liquid crystal layer that satisfies a relationship formula of 0.25<d/p<1, wherein p indicates a natural pitch length and d indicates a cell gap, and is disposed to be twisted by 90° in the liquid crystal cell.

In a preferred embodiment, the natural pitch length p of the liquid crystal layer is adjusted by adding a chiral agent.

In one embodiment, the liquid crystal layer satisfies a relationship formula of 0.5<d/p.

In one embodiment, the liquid crystal layer satisfies a relationship formula of d/p<0.75.

In one embodiment, the liquid crystal layer has a pre-tilt angle adjusted to be smaller than 5°.

In one embodiment, the image shifting part is plural in number.

The image shifting device module includes any of the aforementioned image shifting devices; and a driving circuit for supplying a voltage to the liquid crystal cell of the image shifting device, and the driving circuit changes the voltage in synchronization with switching timing of an image to be shifted.

In one embodiment, the driving circuit applies a voltage of 7 V or more through substantially whole of the liquid crystal layer included in the liquid crystal cell of the image shifting device in a selected period.

The selected period has a length not shorter than a sub-field period of an image.

The image display apparatus includes an image display part for displaying an image; and any of the aforementioned image shifting devices, and light outgoing from the image display part is shifted by using the image shifting device in synchronization with display performed by the image display part.

In one embodiment, the image display apparatus further includes a driving circuit for supplying a voltage to the liquid crystal cell of the image shifting device.

In one embodiment, the driving circuit applies a voltage of 7 V or more through substantially whole of the liquid crystal layer included in the liquid crystal cell of the image shifting device in a selected period.

In one embodiment, the selected period has a length not shorter than a sub-field period of an image.

In one embodiment, the light outgoing from the image display part and entering the image shifting device is linearly polarized light.

In one embodiment, pixels included in the image are superimposed in a time division manner by shifting the image.

Alternatively, the image display apparatus includes a light source; an image display panel having a plurality of pixel regions each capable of modulating light; light controlling means for collecting light from the light source in a corresponding pixel region out of the plurality of pixel regions in accordance with a wave range of the light; an optical system for forming an image on a projection plane by using the light having been modulated by the image display panel; a circuit for creating data of a plurality of sub-frame images on the basis of data of each frame image included in the image and allowing the image display panel to display the plurality of sub-frame images in a time division manner; and any of the aforementioned image shifting devices for shifting, on the projection plane, a sub-frame image selected from the plurality of sub-frame images displayed by the image display panel, and one region on the projection plane is irradiated successively with light of different wave ranges having been modulated by different pixel regions of the image display panel.

The liquid crystal display device of an embodiment of the present invention includes a pair of substrates; a twist oriented liquid crystal layer provided between the pair of substrates; column-shaped spacers provided between the pair of substrates; a pair of polarizing plates opposing each other with the liquid crystal layer sandwiched therebetween and provided with polarization axes thereof substantially orthogonal to each other; and a plurality of pixel regions each defined by a pair of electrodes opposing each other with the liquid crystal layer sandwiched therebetween, and the liquid crystal layer has a twist angle larger than 90°.

The twist angle of the liquid crystal layer is preferably smaller than 180°.

The twist angle of the liquid crystal layer is more preferably not less than 92° and not more than 120°.

The liquid crystal layer may be a horizontally orientated liquid crystal layer including liquid crystal molecules with positive dielectric anisotropy, and the liquid crystal display device may produce display in a normally white mode.

The liquid crystal display device may further include a switching element provided to each of the plurality of pixel regions; and a scanning line and a signal line electrically connected to the switching element, and a direction along which one of the scanning line and the signal line extends may be substantially orthogonal to an orientation direction of liquid crystal molecules disposed in the vicinity of a center along a thickness direction of the liquid crystal layer.

When the liquid crystal display device further includes a pair of alignment films provided on faces of the pair of substrates facing the liquid crystal layer, one of the pair of alignment films is preferably formed so as to cover the column-shaped spacers.

The column-shaped spacers are preferably formed in regions other than the plurality of pixel regions.

The liquid crystal layer may include an optical isomer.

The projection image display apparatus of an embodiment of the present invention includes any of the aforementioned liquid crystal display devices; and a light source for emitting light to the liquid crystal display device, whereby achieving the object.

Alternatively, the liquid crystal display device of an embodiment of the present invention includes a pair of substrates opposing each other and each having an alignment film on an inner face thereof; and a liquid crystal layer sandwiched between the pair of substrates and made of nematic liquid crystal having a twist angle $\theta$ (°) peculiar to a material satisfying $0 \leq \theta \leq 220$, and the nematic liquid crystal of the liquid crystal layer is set so as to satisfy the following relationship formula between a twist angle $\phi$ (°) specified by the alignment film and the twist angle $\theta$ (°) peculiar to the material:

$$0.075 \times \theta \times 84 \leq \phi \leq 0.075 \times \theta + 96.$$

In this structure, the twist angle $\phi$ (°) of the nematic liquid crystal of the liquid crystal layer specified by the alignment film is set to fall within a given range in accordance with the relationship with the twist angle $\theta$ (°) peculiar to the material of the nematic liquid crystal. Therefore, as described in examples below, high contrast can be attained without increasing a driving voltage. Accordingly, even when the response speed attained in turning the voltage off is improved by increasing the twist angle $\theta$ peculiar to the material of the nematic liquid crystal, high contrast can be attained without increasing the driving voltage by setting the twist angle $\phi$ (°) specified by the alignment film within the given range.

At this point, the twist angle $\theta$ (°) peculiar to the material of the nematic liquid crystal is represented by $360 \times d/p$ (°) when the thickness of the liquid crystal layer is indicated by d ($\mu$m) and the twist pitch (natural chiral pitch) peculiar to the material of the nematic liquid crystal is indicated by p ($\mu$m).

In an embodiment of the present invention, the twist angle $\phi$ (°) specified by the alignment film of the nematic liquid crystal of the liquid crystal layer may be set so as to satisfy the following relationship formula with the twist angle $\theta$ (°) peculiar to the material:

$$0.075 \times \theta + 88 \leq \phi \leq 0.075 \times \theta + \rho.$$

In this structure, higher contrast can be attained as described in examples below.

As disclosed in Japanese Laid-Open Patent Publication No. 2000-199901, as the twist angle $\theta$ (°) peculiar to the material of the nematic liquid crystal is larger, the response speed attained in turning the voltage off is higher. Therefore, when $\theta$ (°) is set in accordance with a desired response speed and the twist angle $\phi$(°) specified by the alignment film is set in accordance with $\theta$ (°), the response speed attained in turning the voltage off can be improved and high contrast can be realized without increasing the driving voltage.

The twist angle $\theta$ (°) peculiar to the material of the nematic liquid crystal is defined as preferably $18 \leq \theta \leq 220$, more preferably $45 \leq \theta \leq 220$, further preferably $90 \leq \theta \leq 220$, still more preferably $135 \leq \theta \leq 220$ and most preferably $180 \leq \theta \leq 220$.

When the twist angle $\theta$ (°) peculiar to the material of the nematic liquid crystal is defined as $45 \leq \theta \leq 220$, $90 \leq \theta \leq 220$ or $135 \leq \theta \leq 220$, the rotational viscosity $\gamma_1$ (Pa·s) at 40° C. of the nematic liquid crystal preferably satisfies $\gamma_1 \leq 0.1$.

In this structure, a high response speed can be attained in turning the voltage off as described in examples below.

BRIEF DESCRIPTION OF DRAWINGS

FIGS. 5(a) and 5(b) are diagrams for showing high resolution of an image attained by the image shifting device of FIG. 3, and specifically, FIG. 5(a) shows an image obtained when the image shifting device is not operated and FIG. 5(b) shows an image obtained when the image shifting device is operated.

DETAILED DESCRIPTION (Image Shifting Device, Image Shifting Module and Image Display Apparatus)

Figure 1:
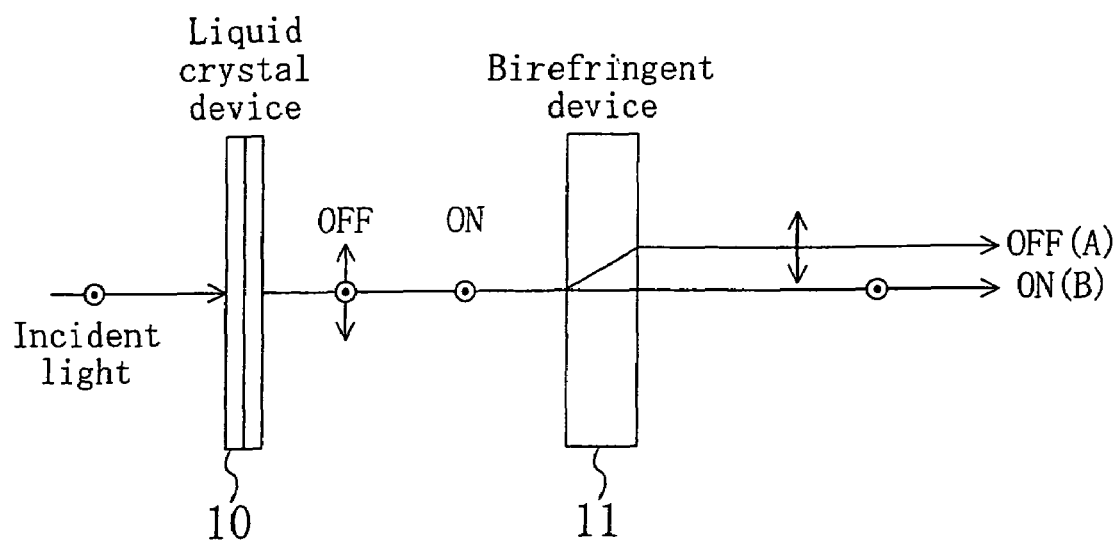
FIG. 1 is a diagram for showing a conventional structure of an image shifting device composed of a combination of a liquid crystal device and a birefringent device.
Figure 2:
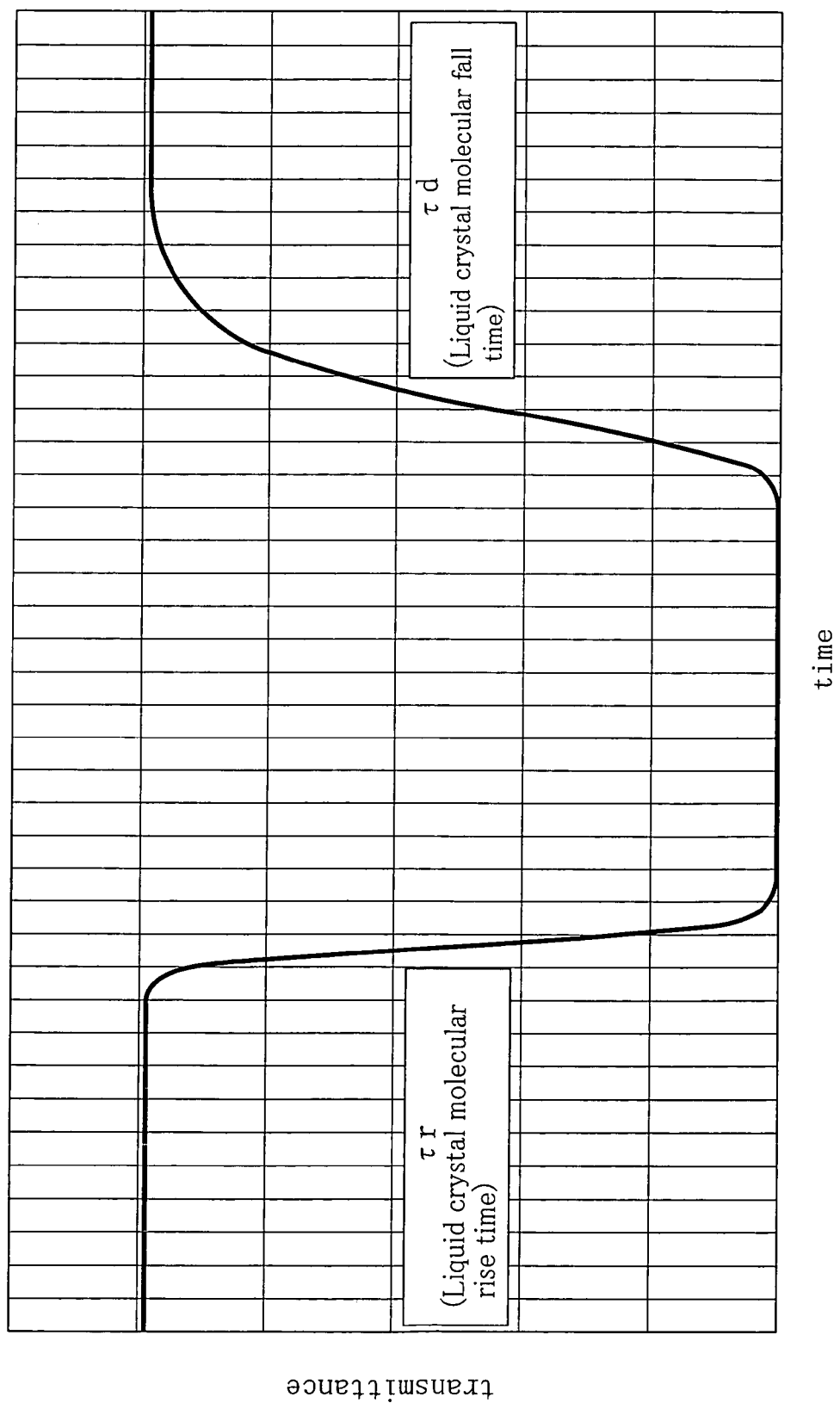
FIG. 2 is a graph for showing a liquid crystal application voltage-transmittance characteristic obtained when a pair of polarizing plates are orthogonally provided and a liquid crystal device is disposed between the polarizing plates, wherein the ordinate and the abscissa are shown in arbitrary units.

An image shifting device of an embodiment of the present invention includes at least one image shifting part for periodically shifting the position of an optical axis. This image shifting part includes, similarly to the conventional image shifting device shown in FIG. 1, a liquid crystal cell and a birefringent device. As one characteristic of this embodiment, a liquid crystal layer included in the liquid crystal cell is made of a TN liquid crystal layer satisfying a relationship formula of 0.25<d/p<1, wherein a natural pitch length is indicated by p and a cell gap is indicated by d, and is disposed so as to be twisted by 90° in the liquid crystal cell.

A value indicated by d/p can be controlled in accordance with the type and the concentration of a chiral agent to be added to the liquid crystal layer. When the HTP (Helical Twisting Power) of the chiral agent is indicated by x and the concentration of the chiral agent is indicated by c, the natural pitch length p of the liquid crystal is represented by the following formula using x and c:

$$p=1/(c \cdot x)$$

Since x has a value peculiar to the combination of the liquid crystal and the chiral agent, a desired natural pitch length p can be obtained by adjusting the concentration c of the chiral agent.

At this point, in a liquid crystal layer with a cell gap d (=the thickness of the liquid crystal layer), a natural twist angle $\phi$ is represented by the following formula:

$$\phi=(d/p) \cdot 360°$$

This natural twist angle $\phi$ is a naturally obtained twist angle when the orientation of liquid crystal molecules disposed on top and bottom faces of the liquid crystal layer is not regulated by using an alignment film or the like.

In the present invention, p is reduced by adjusting the concentration c of the chiral agent, so that d/p can satisfy a relationship formula of 0.25<d/p<1. In this case, the natural twist angle $\phi$ is an angle satisfying 90°<$\phi$<360°. On the other hand, in the present invention, the twist angle is regulated by using an alignment film or the like, so as to set the twist angle of the liquid crystal layer to 90°.

In this manner, the natural twist angle $\phi$ is set to exceed 90° by adding, to the liquid crystal layer of the image shifting device, the chiral agent in a concentration higher than that in a practically used liquid crystal display apparatus. Therefore, in a state where the liquid crystal layer is twisted by 90° by using an alignment film or the like, strain is caused in the liquid crystal layer. Owing to the strain thus caused, a response speed attained when a voltage applied through the liquid crystal layer is changed from an on-state to an off-state can be improved.

From the viewpoint of improvement of the response speed, a relationship formula of $0.5<d/p$ is preferably satisfied. However, as d/p is larger, it is necessary to increase the applied voltage in an on-state, and hence, $d/p<0.75$ preferably.

The liquid crystal layer in which d/p is set to be rather high is used not in a liquid crystal display apparatus but in the liquid crystal cell included in the image shifting device. The liquid crystal cell included in the image shifting device need not produce intermediate gray scale display but is required to perform binary switching between a state where the polarization plane of incident light is rotated and a state where it is not rotated. Also, in the liquid crystal cell included in the image shifting device, it is generally necessary to shift an image not through line sequential scanning but through switching on the whole plane in batch. Therefore, in the liquid crystal cell of the image shifting device, a voltage is applied through a large region (typically, substantially the whole region) of the liquid crystal layer and the voltage application is continued during a sub-field period or a longer period. In other words, in the liquid crystal cell of the image shifting device, not the active matrix driving but static driving can be performed, and in addition, a unit region where the state of the liquid crystal layer is transited does not correspond to a size substantially equal to a pixel but a size of, for example, several square centimeters or more.

On the other hand, in a liquid crystal display apparatus, it is necessary to change the voltage application state of a liquid crystal layer in every small region corresponding to each pixel in order to form an image. Also, in the case where the line sequential driving is employed, for example, after a low voltage is applied through a liquid crystal region on one scanning line, a high voltage may be applied through a liquid crystal region on a next scanning line. In such a case, the states of the liquid crystal in the adjacent pixel regions interfere with each other, so that the state of the liquid crystal may be unstabilized.

In such a liquid crystal display apparatus, when d/p is set to be larger than, for example, 0.5, the state of the liquid crystal is strongly affected by the liquid crystal in an adjacent region unless the pre-tilt angle is set to 5° or more, and hence, light leakage or disclination can be caused to lower display quality, or a stable operation cannot be performed.

In contrast, in the liquid crystal cell of the image display apparatus of an embodiment of the present invention, a substantially uniform voltage is statically applied through a wide region of the liquid crystal layer, and therefore, even when d/p is larger than 0.5, the stability of the liquid crystal can be kept and the pre-tilt angle can be arbitrarily set. Conversely, when the pre-tilt angle is set to be large, optical rotation caused in the liquid crystal layer under application of no voltage becomes abnormal, and a residual component is added to polarized light, so as to degrade the degree of polarization. Therefore, the pre-tilt angle is preferably small in an embodiment of the present invention. Accordingly, the pre-tilt angle is preferably smaller than 5°, more preferably smaller than 4° and still more preferably smaller than 3°.

In this manner, even through d/p is large, the pre-tilt angle can be set to a sufficiently small value, and therefore, the polarization characteristic of the liquid crystal can be abruptly switched.

As described above, in the image shifting device of an embodiment of the present invention, a predetermined voltage is continuously applied by a driving circuit (not via a thin film transistor or the like) through substantially the whole liquid crystal layer during a sub-field period or a longer period, and therefore, the state of the liquid crystal can be stably kept, so as to realize switching of the polarization plane at high accuracy. Accordingly, even when d/p is set to a large value (such as a value larger than 0.5) that cannot be practically employed in a liquid crystal display apparatus, the state of the liquid crystal attained in a voltage off-state can be stabilized with the pre-tilt angle kept sufficiently small, and hence, occurrence of a double image can be effectively prevented.

Now, the relationship between the response speed of the liquid crystal and d/p will be described with reference to FIGS. 10 through 13.

Figure 10:
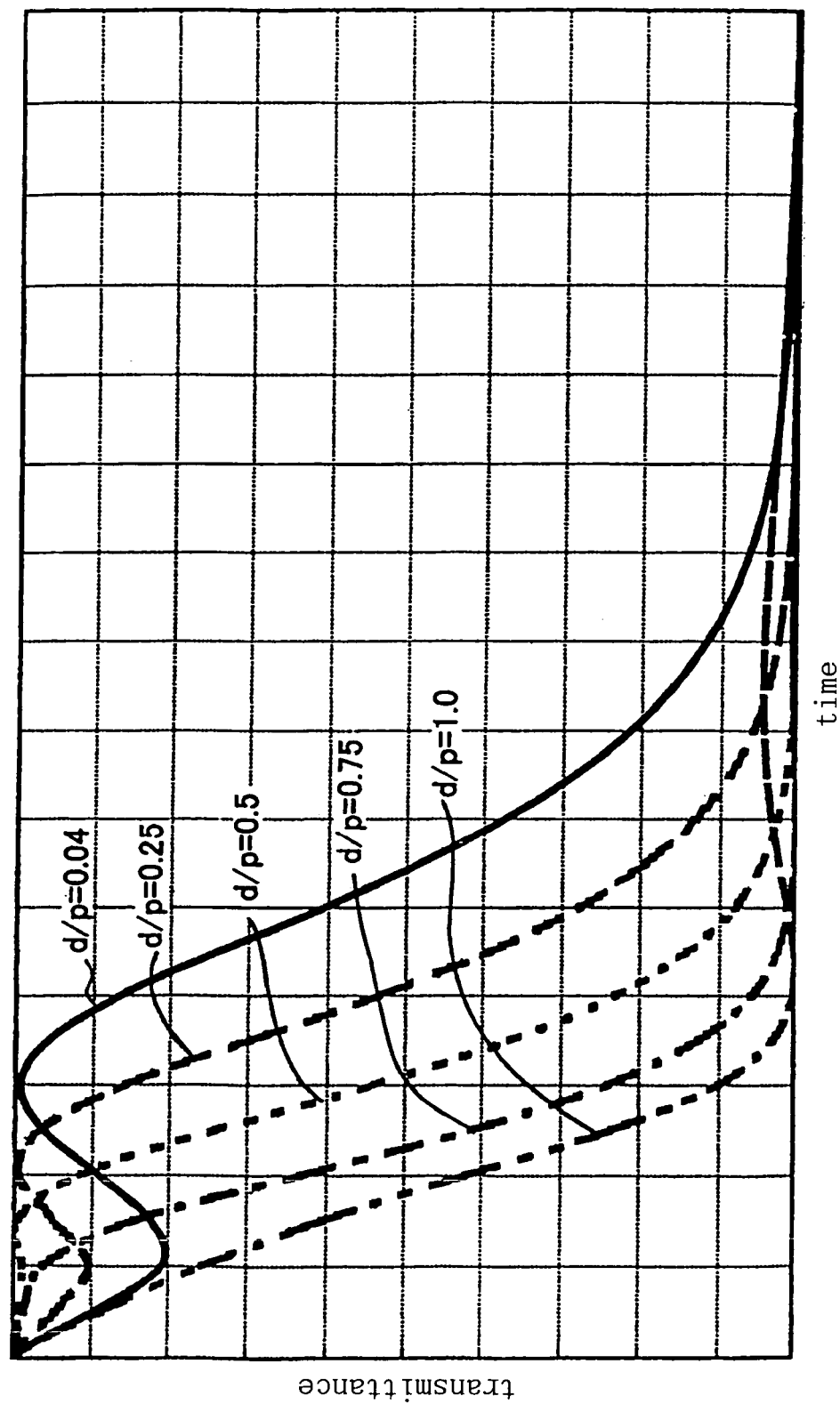
FIG. 10 is a graph for showing the relationship between a "fall response" of liquid crystal and d/p (obtained through simulation), wherein the abscissa indicates time (in an arbitrary unit).

First, FIG. 10 is referred. FIG. 10 shows the relationship between "fall response" of the liquid crystal and d/p. This relationship is obtained through computer simulation. As is understood from FIG. 10, as d/p exceeds 0.25 and is approximate to 1, the fall response time of the liquid crystal is shorter.

Also, it is understood from FIG. 10 that when d/p is 0.25 or less, the transmittance is once lowered and then increased again to reach 100%. This is derived from a phenomenon (back flow) that liquid crystal molecules disposed at substantially the center of the liquid crystal layer are given a force in a reverse direction due to the viscosity of the liquid crystal disposed in a position close to the substrate when the voltage applied through the liquid crystal layer is released. When the content of the chiral agent is increased, the back flow can be suppressed so as to increase the response speed.

Figure 11:
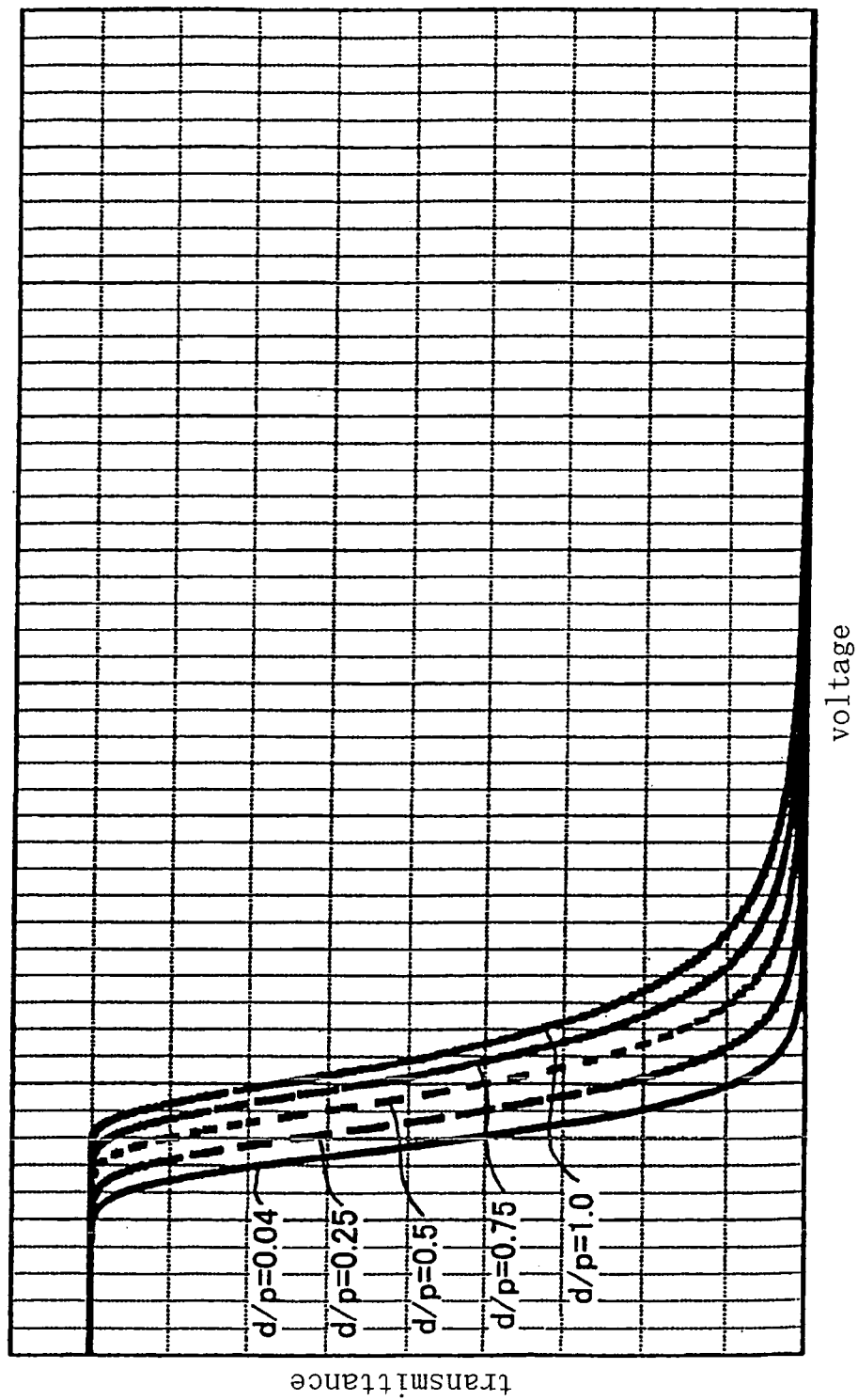
FIG. 11 is a graph for showing change of a "voltage-transmittance curve" depending upon d/p (obtained through simulation), wherein the abscissa indicates a voltage (in arbitrary unit).

FIG. 11 shows change of a "voltage-transmittance curve" depending upon d/p. This voltage-transmittance curve is also obtained through computer simulation. As is understood from FIG. 11, a voltage necessary to attain transmittance of zero (namely, a High level of the voltage) should be higher as d/p exceeds 0.25 and is approximate to 1. It is found through experiments that the applied voltage is preferably 7 V or more and more preferably 10 V or more.

In a liquid crystal display apparatus, when the active matrix driving is employed, a voltage is applied through a liquid crystal layer via a switching element and a pixel electrode, and therefore, a large voltage exceeding 7 V cannot be applied through the liquid crystal layer, and the magnitude of the applied voltage tends to reduce with time. Therefore, in a liquid crystal display apparatus, when d/p is large, there arises a problem that the transmittance is lowered or is reduced with time. However, in the image shifting device, since a predetermined voltage can be applied by the driving circuit to a pair of transparent electrodes of the liquid crystal cell, a voltage with desired magnitude necessary for controlling the state of the liquid crystal can be appropriately applied through the liquid crystal layer.

Figure 12:
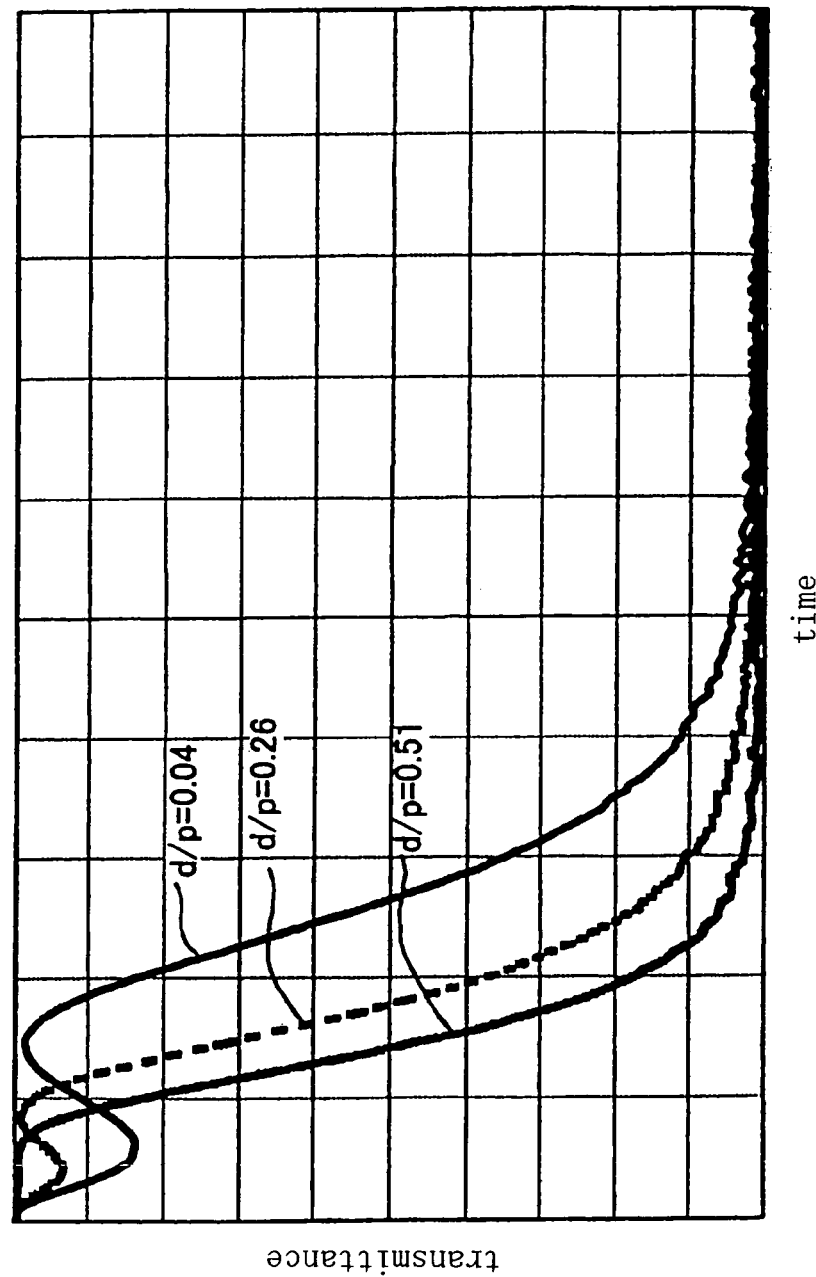
FIG. 12 is a graph for showing actually measured values of the "fall response" when d/p is 0.40, 0.26 and 0.51, wherein the abscissa indicates time (in arbitrary unit).

FIG. 12 shows "fall" response curves of the liquid crystal actually measured when d/p is 0.04, 0.26 and 0.51. As is understood from FIG. 12, when d/p is 0.26, the aforementioned back flow is suppressed. It is understood that this suppression of the back flow is remarkably attained when d/p exceeds 0.5.

Figure 13:
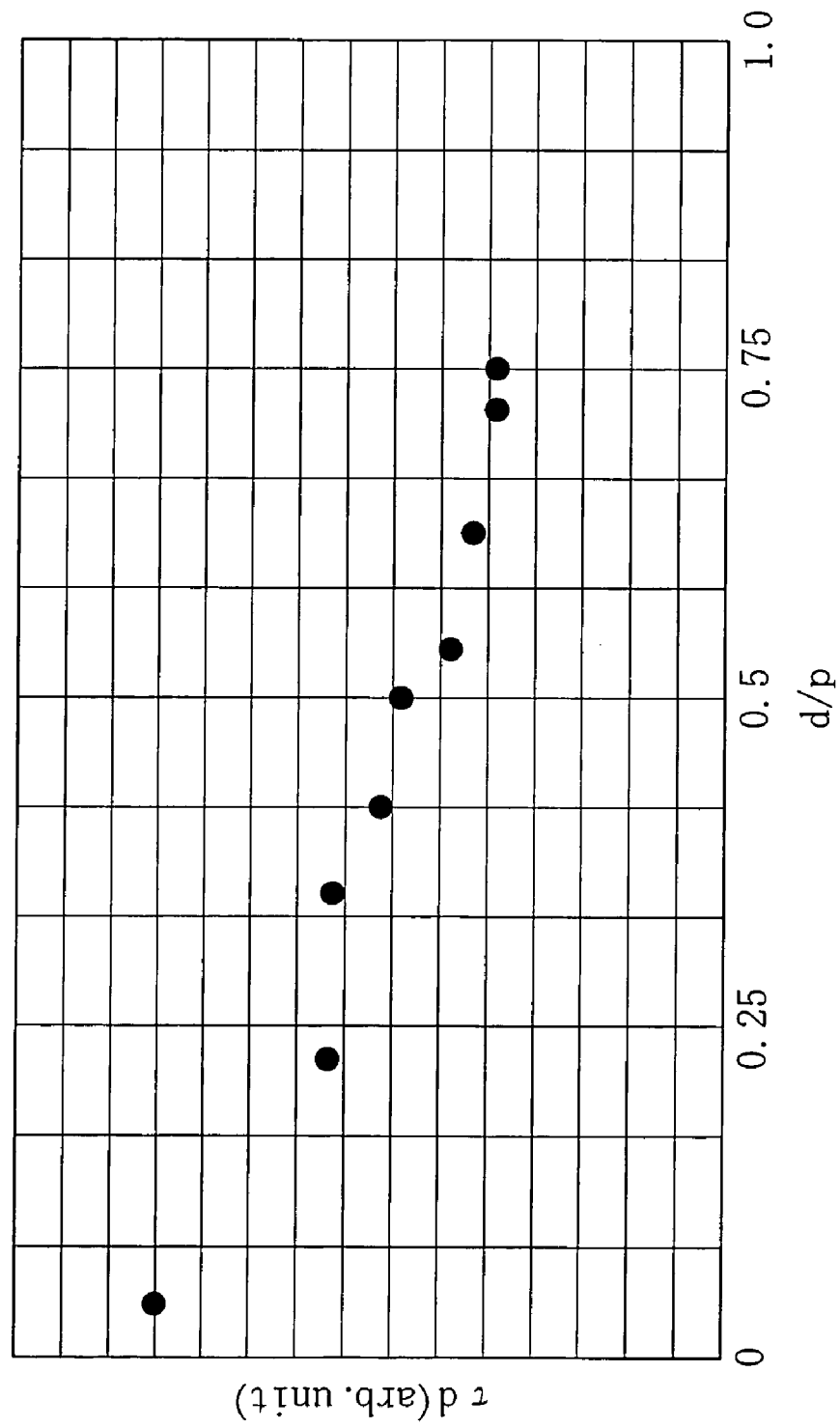
FIG. 13 is a graph for showing the relationship between fall response time τd (actually measured values) and d/p, wherein the ordinate indicates time (in arbitrary unit).

FIG. 13 is a graph for showing the relationship between actually measured values of the fall response time τd of the liquid crystal and d/p. As is understood from FIG. 13, as d/p exceeds 0.25 and becomes larger, the fall response speed τd of the liquid crystal is shorter. When d/p exceeds 0.5, the fall response speed τd correspondingly attained is as short as 50% or less of the fall response speed τd attained when d/p is 0.04 (comparative example). It is found through experiments that as d/p exceeds 0.5 and is approximate to 1, the 90° twisted state of the liquid crystal becomes more unstable and twist of 270° is more likely to be caused. Therefore, d/p is preferably set to be smaller than 0.75. The most preferable range of d/p is 0.5<d/p<0.65.

Herein, assuming that the polarization plane of light having passed through liquid crystal can be either of two states with a difference of 90° in accordance with High/Low level of a voltage applied through the liquid crystal layer, when a voltage of High level is applied through the liquid crystal layer so that desired linearly polarized light can outgo, it is described as "the liquid crystal layer (or the liquid crystal cell) being in an on-state". On the other hand, when a voltage sufficiently smaller than magnitude (in the absolute value) of the voltage necessary for placing the liquid crystal layer in an "on-state" is applied through the liquid crystal layer, and as a result, light with a polarization plane substantially orthogonal to the polarization plane of the outgoing light obtained when the liquid crystal layer is in an "on-state" outgoes from the liquid crystal layer, it is described as "the liquid crystal layer (or the liquid crystal cell) being in an off-state".

In order to place the liquid crystal layer in an "off-state", the magnitude of the voltage (at Low level) applied through the liquid crystal layer is made zero. However, when the liquid crystal layer is to be placed in an "off-state", a voltage having a value other than zero (for example, of 2.5 V) (namely, an off-set voltage) may be applied.

Herein, an applied voltage at High level means a voltage at a level for placing the liquid crystal layer in an "on-state", and an applied voltage at Low level means a voltage at a level for placing the liquid crystal layer in an "off-state". In the case where TN liquid crystal with positive refractive index anisotropy $\Delta \in$ is used, when the liquid crystal is in an "on-state", liquid crystal molecules are oriented along the electric field, and when the liquid crystal is in an "off-state", the liquid crystal molecules are twisted by approximately 90°. On the other hand, in the case where TN liquid crystal with negative refractive index anisotropy $\Delta \in$ is used, when the liquid crystal is in an "on-state", liquid crystal molecules are twisted by approximately 90°, and when the liquid crystal is in an "off-state", the liquid crystal molecules are oriented along one direction. Herein, description is given mainly by assuming that liquid crystal with positive refractive index anisotropy $\Delta \in$ is used, but the present invention can be practiced also when liquid crystal with negative refractive index anisotropy $\Delta \in$ is used.

Now, preferred embodiments of an image display apparatus according to the present invention will be described with reference to the accompanying drawings.

EMBODIMENT 1

Figure 3:
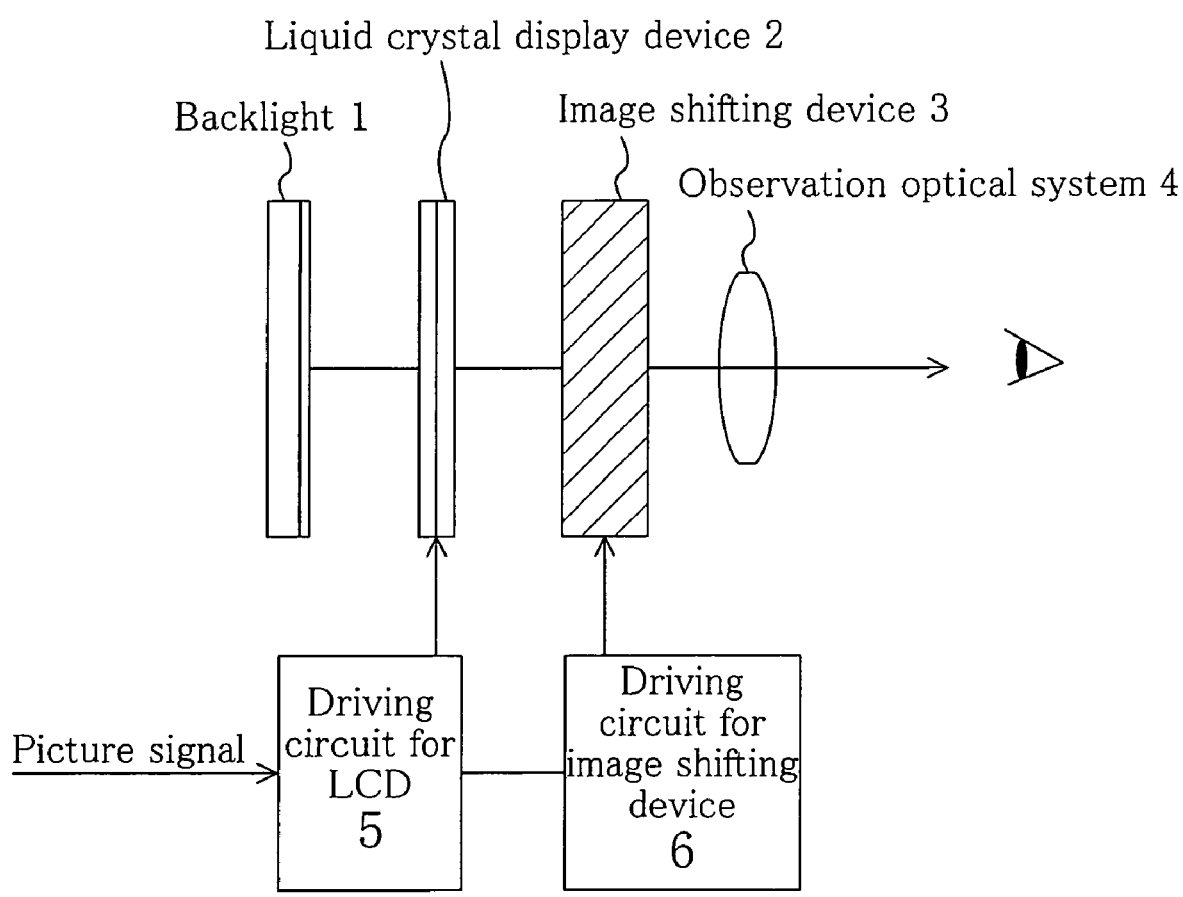
FIG. 3 is a cross-sectional view for showing the basic structure of an image shifting device module according to an embodiment of the invention.
Figure 4A:
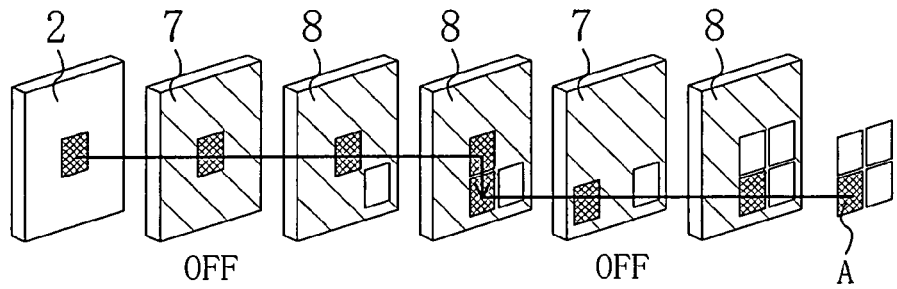
FIGS. 4(a) through 4(d) are diagrams for showing an operation of an image shifting device used in Embodiment 1.
Figure 4B:
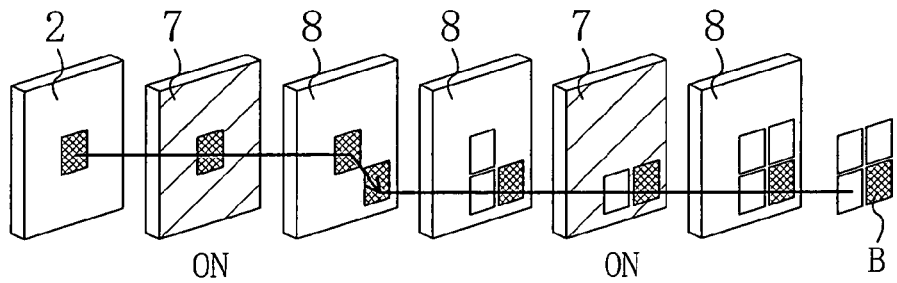
Figure 4C:
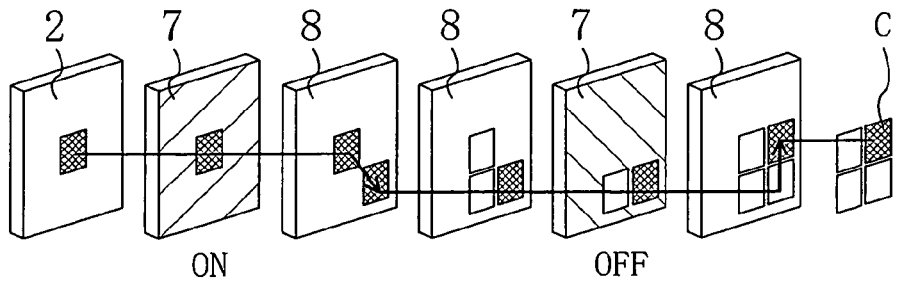
Figure 4D:
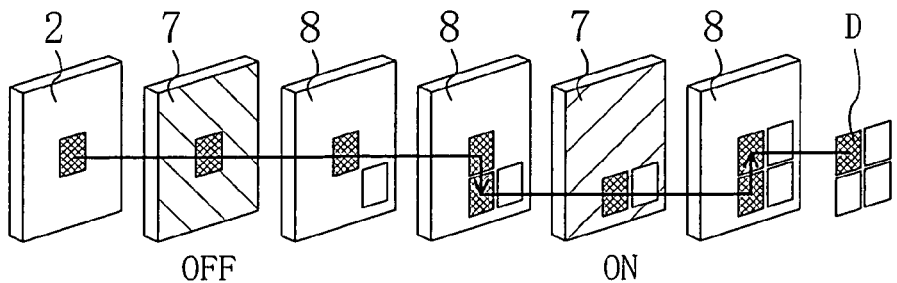

First, FIG. 3 is referred. FIG. 3 is a schematic diagram of an image display apparatus according to an embodiment of the present invention.

The image display apparatus of this embodiment shown in the drawing includes a backlight 1, a liquid crystal display device 2, an image shifting device 3 and an observation optical system 4. The backlight 1 is a light source for illuminating the transmission liquid crystal display apparatus 2, and the liquid crystal display device 2 receives a driving signal and a picture signal from a driving circuit 5 and can display an image with a content corresponding to the picture signal. The observation optical system 4 is an optical system for optically enlarging the image displayed by the liquid crystal display device 2. An observer can observe the image displayed by the liquid crystal display apparatus 2 through the image shifting device 3 and the observation optical system 4.

Although the transmission liquid crystal display device requiring the backlight is used in this embodiment, a reflection liquid crystal device as well as any selfluminous display device, such as an organic EL device or a plasma display panel (PDP), can be used as far as it is a device capable of displaying an image.

The operation of the image shifting device 3 is controlled by a driving circuit 6 for the image shifting device. This driving circuit 6 supplies, to the image shifting device 3, a driving signal in synchronization with image display of the liquid crystal display device 2. The driving circuit 6 includes a voltage application part for applying a voltage at High or Low level to a liquid crystal device included in the image shifting device 3. Such an image shifting device 3 and the driving circuit together construct an image shifting device module.

Among the aforementioned elements, the backlight 1, the liquid crystal display device 2, the observation optical system 4 and the driving circuit 5 have similar structures to devices and circuit used in a conventional image display apparatus, and the display apparatus of this embodiment is characterized by the structure and the operation of the image shifting device 3. Now, referring to FIGS. 4(*a*) through 4(*d*), the image shifting device 3 will be described in detail.

The image shifting device 3 shown in the drawings includes two liquid crystal devices 7 and three birefringent devices 8. Each of the two liquid crystal devices 7 includes a liquid crystal layer and a pair of transparent electrodes sandwiching the light incident face and the light outgoing face of the liquid crystal layer. Each liquid crystal device 7 used in this embodiment performs switching between a state where the polarization plane of incident light is rotated by approximately 90° (a first state) and a state where the incident light is allowed to directly outgo without substantially rotating the polarization plane (a second state), and can selectively enter either state in accordance with the magnitude of the applied voltage.

Each liquid crystal device 7 of this embodiment is fabricated by using a liquid crystal cell in which d/p is set to approximately 0.55 through 0.75 by, for example, adding approximately 1.5 through 3 mass % of a chiral agent (S-811: manufactured by Merck) to ZLI-2293 liquid crystal manufactured by Merck. The value of d/p is not limited to the aforementioned range but is set to a necessary value within a range of 0.25 through 1. In this embodiment, the preferable range of d/p is 0.5 through 0.65.

The birefringent device 8 is made from a uniaxial crystal material (such as crystal). The material used for the birefringent device 8 is also not limited to crystal, and any uniaxial crystal material may be used. For example, lithium niobate, calcite, rutile ($TiO_2$) or Chile saltpeter ($NaNO_3$) can be used as the material. However, in the case where it is necessary to reduce the total weight of the display apparatus as in application to an HMD, lithium niobate or rutile having relatively large refractive index anisotropy ($\Delta n$) is preferably used. When a material with large $\Delta n$ is used, the thickness of the birefringent device 8 necessary for obtaining a desired amount of image shift can be reduced, and hence such a material is suitably used for reducing the size and the weight.

The birefringent device 8 has an optical axis inclined against a light incident plane of the birefringent device 8. The birefringent device 8 can separate incident light beams into ordinary light and extraordinary light on a plane including the proceeding direction of the incident light and the optical axis (hereinafter referred to as the "principal cross-section"). Accordingly, if the polarization direction of light entering the birefringent device 8 is vertical to the "principal cross-section", the incident light is ordinary light for the birefringent device 8 and hence is propagated straight on the principal cross-section. On the other hand, if the polarization direction of light entering the birefringent device 8 is parallel to the principal cross-section, the incident light is extraordinary light for the birefringent device 8 and hence is refracted on the cross-section.

Accordingly, when the polarization direction of incident light is switched to a direction vertical or horizontal to the principal cross-section of the birefringent device 8 by changing the level of the voltage applied to the liquid crystal device 7, the incident light can be shifted on the principal cross-section of the birefringent device 8. As a result, an image displayed by the display device 2 can be shifted to a direction vertical to the optical axis of the incident light. In this embodiment, since the TN liquid crystal whose fall response speed is improved by adjusting dip is used, the polarization direction can be rapidly switched. It is noted that the pre-tilt angle is set to approximately 2° in this embodiment.

In FIG. 4(*a*), the two liquid crystal devices 7 are both placed in an "off-state", so as to introduce the light beam to a position A on a virtual plane. In FIG. 4(*b*), the two liquid crystal devices 7 are both placed in an "on-state", so as to introduce the light beam to a position B on the virtual plane. In FIG. 4(*c*), the two liquid crystal devices 7 are placed in an "on-state" and an "off-state", respectively, so as to introduce the light beam to a position C on the virtual plane. In FIG. 4(*d*), the two liquid crystal devices 7 are placed in an "off-state" and an "on-state", respectively, so as to introduce the light beam to a position D on the virtual plane.

In this manner, an image displayed on the display device 2 can be shifted to the positions A→B→C→D→A→etc. by controlling the voltages applied to the two liquid crystal devices 7. Such shift of an image is executed in synchronization with switching timing of an image displayed by the display device 2.

FIG. 5(*a*) shows pixel arrangement obtained when the shifting operation of the image shifting device is not performed and FIG. 5(*b*) shows pixel arrangement obtained when the shifting operation of the image shifting device is performed. It is understood that the number of pixels of the liquid crystal display device 2 is increased effectively four times by using the image shifting device.

Herein, when a voltage for controlling the polarization plane is applied to the liquid crystal device 7 and the polarization plane of light outgoing from the liquid crystal device 7 is rotated by approximately 90° from that obtained under application of no voltage, it is described as "the liquid crystal device being in an on-state". On the other hand, when a voltage sufficiently smaller than the magnitude (in the absolute value) of a voltage necessary for placing the liquid crystal device in "an on-state" is applied through the liquid crystal of the liquid crystal device 7 and as a result, light having a polarization plane substantially orthogonal to the polarization plane of the outgoing light obtained when the liquid crystal device 7 is in an "on-state" outgoes from the liquid crystal device 7, it is described as "the liquid crystal device being in an "off-state".

In order to place the liquid crystal device in an "off-state", a voltage having a value other than zero (for example, of 2.5 V) (an off-set voltage) may be applied.

As described above, in this embodiment, the magnitude of the voltage to be applied to each liquid crystal device 7 of the image shifting device is switched between a relatively high level (of, for example, 8 V or more) and a relatively low level (of, for example, 1 V or less), thereby successively shifting one pixel on a virtual plane to four different positions A→B→C→D.

Although the displayed pixel is shifted successively to the four positions in this embodiment, the shifting direction and the number of shift positions of the image shifting device of the present invention are not limited to the above. Also, the display apparatus of this embodiment is suitably used as an HMD, which does not limit the present invention. The present invention may also be used in a projection image display apparatus. In this case, an illumination light source with directivity is used instead of the backlight 1 for emitting diffuse light and a projection lens is used instead of the observation optical system 4.

EMBODIMENT 2

Figure 6:
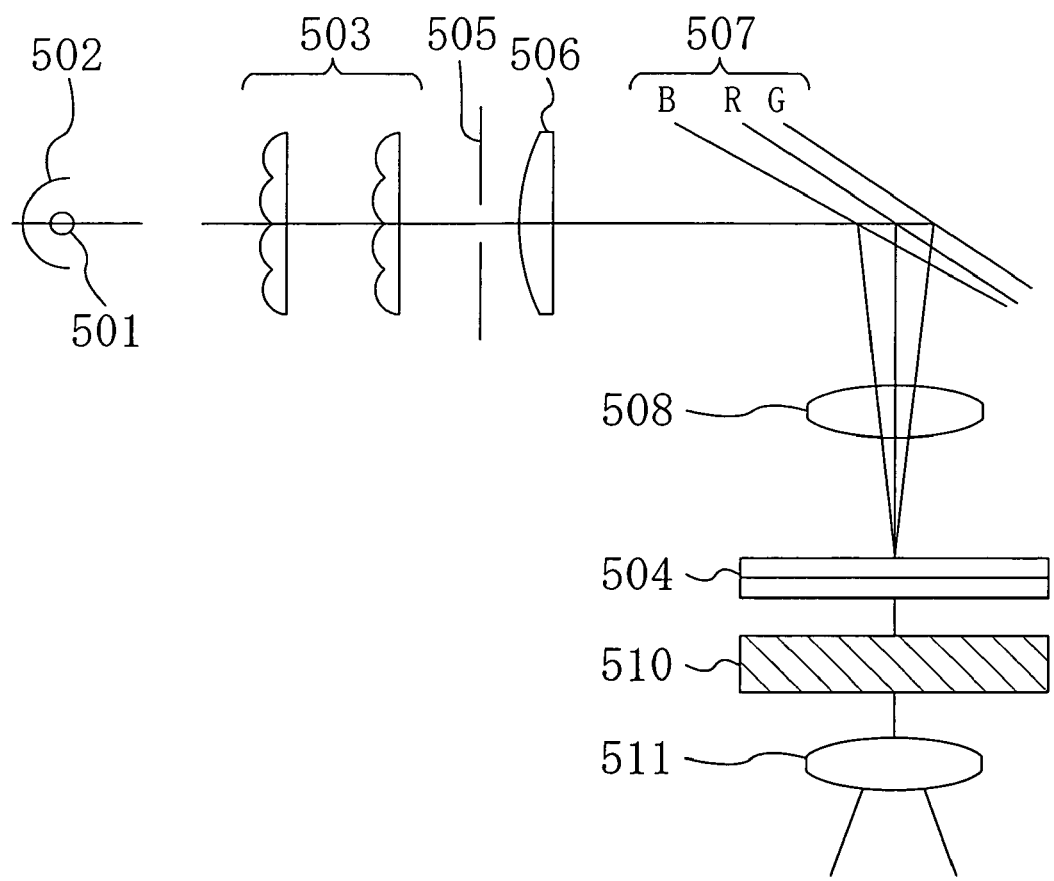
FIG. 6 is a diagram of an image display apparatus according to Embodiment 2 of the invention.

Next, an image display apparatus according to another embodiment will be described with reference to FIG. 6.

In the image display apparatus of this embodiment, light emitted from a light source 501 (light including at least RGB components) is reflected by a parabolic mirror 502 and changed into substantially parallel beam, and then enters a fly eye lens 503. The fly eye lens 503 is used for uniformly illuminating a liquid crystal panel 504. On the outgoing side of the fly eye lens 503, an aperture 505 for regulating the degree of parallelization of the illumination light entering the liquid crystal panel 504 is provided. The aperture 505 has a rectangular opening and its shape is designed in accordance with the shape of a pixel. The light having passed through the aperture 505 passes through a lens 506 and is separated into RGB light by dichroic mirrors 507R, 507G and 507B. The liquid crystal panel 504 is illuminated by the light having been changed into substantially parallel light by the lens 506 and a lens 508, and the respective RGB light having been separated by the dichroic mirrors enter the liquid crystal panel 504 at different angles. In this embodiment, a 0.9-inch panel (768×1024 dots) is used as the liquid crystal panel 504.

Figure 7:
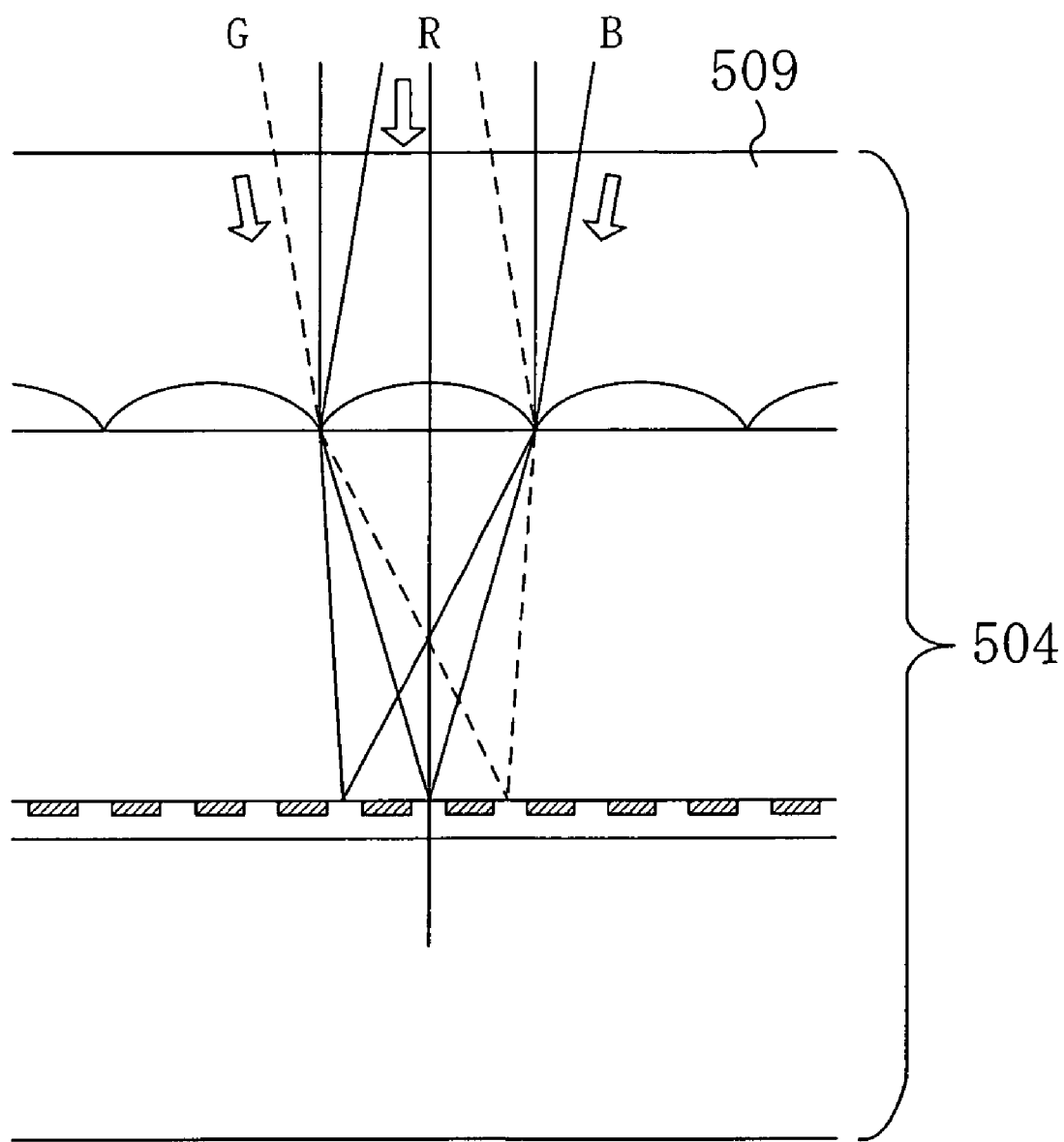
FIG. 7 is a cross-sectional view of a liquid crystal display panel used in Embodiment 2.

FIG. 7 is a cross-sectional view for showing the state where the RGB light enter the liquid crystal panel 504. As shown in FIG. 7, on the light incident side of the liquid crystal panel 504, an array of microlenses 509 each corresponding to three pixels (a pixel for R, a pixel for G and a pixel for B) is provided. Each microlens 509 allows the RGB light entering at the different angles to enter the corresponding pixels. Since each pixel is independently driven, the RGB light are independently modulated.

Referring to FIG. 6 again, light having been modulated by passing through the liquid crystal panel 504 passes through an image shifting device 510 and enters a projection lens 511. Light having passed through the projection lens 511 forms an image on a screen. The image formed on the screen is periodically shifted by the image shifting device 510.

Figure 8:
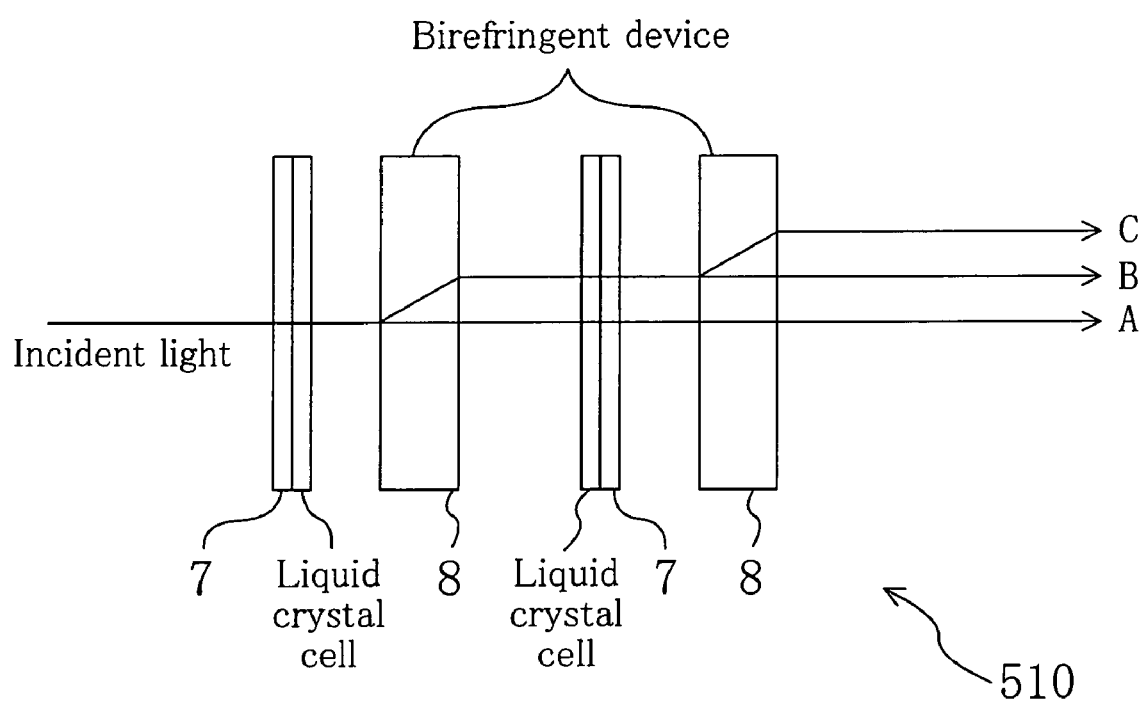
FIG. 8 is a cross-sectional view of an image shifting device used in Embodiment 2.

Next, the image shifting device 510 of this embodiment will be described in detail with reference to FIG. 8. The image shifting device 510 has a structure in which two liquid crystal devices (liquid crystal cells) 7 and two birefringent devices 8 are alternately disposed along a line as shown in FIG. 8, and can shift an image to three different positions (A, B and C) on a plane crossing the optical axis ("a principal cross-section"). Each combination of the liquid crystal device 7 and the birefringent device 8 has a similar structure to that shown in FIG. 3, and the liquid crystal device 7 included in the image shifting device 510 is constructed by using TN liquid crystal having equivalent characteristics to those of the display apparatus of Embodiment 1.

Figure 9:
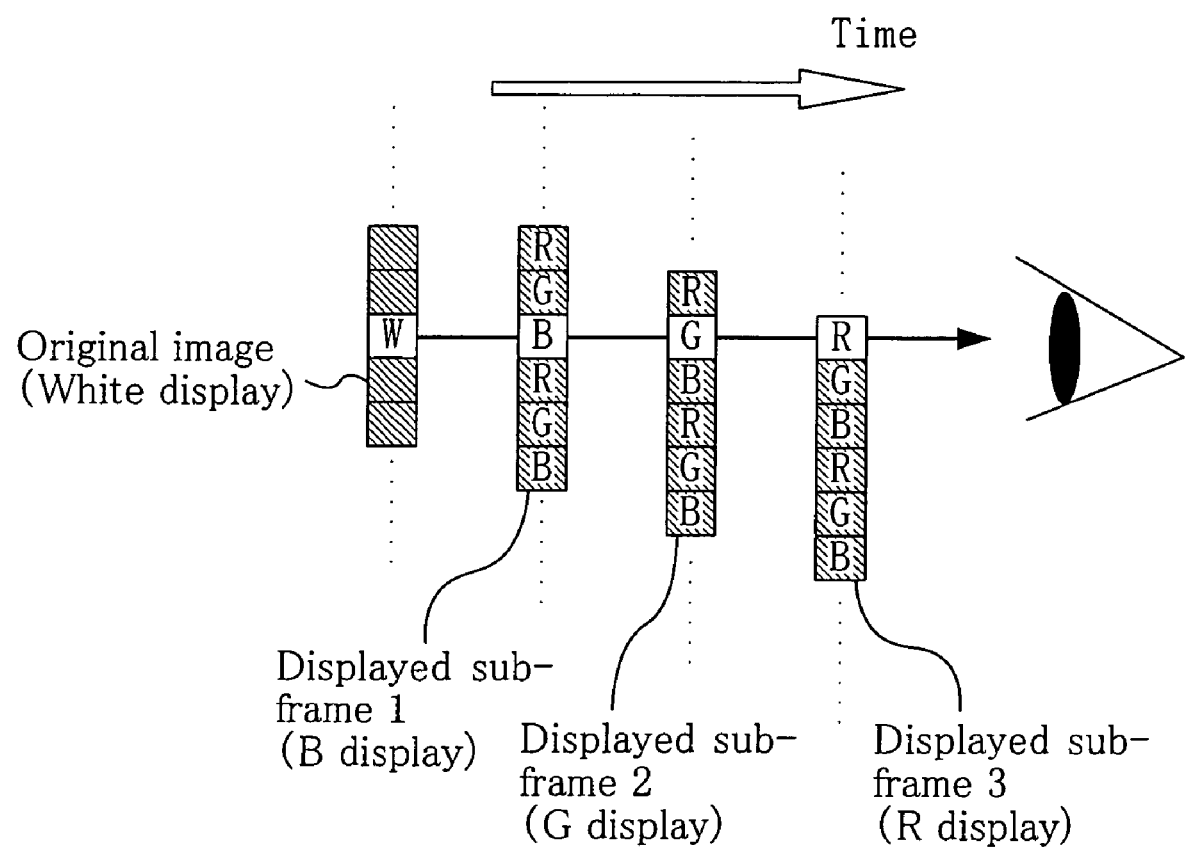
FIG. 9 is a diagram for schematically showing shift of an image.

FIG. 9 schematically shows vertical movement of a sub-frame image having been shifted by the image shifting device 510 of FIG. 8. Owing to the function of the image shifting device 510, the sub-frame image included in an image is successively shifted by every pixel pitch in the vertical direction (or the lateral direction), and as a result, the band of light illuminating one pixel region on the screen is changed, for example, in the order of B→G→R→B→G→R, etc. When such a structure is employed, even a single-plate type display apparatus can realize resolution at an equivalent level to that attained by a three-plate type projection image display apparatus using three liquid crystal display panels.

According to this embodiment, since the image shifting device is constructed by using a liquid crystal layer with a high fall response speed, the image shift can be rapidly performed while suppressing the occurrence of a double image.

Although a UHP lamp with an output power of 120 W and an arc length of 1.4 mm manufactured by Phillips is used as the light source 501 in this embodiment, a halogen lamp, a xenon lamp, metal halide lamp or the like can be used as the light source instead.

Although the image display apparatus of this embodiment is a projection display apparatus for projecting a displayed image on the screen, it is applicable to an HMD by using an observation optical system.

(Liquid Crystal Display Device and Projection Image Display Apparatus)

Now, a liquid crystal display device and a projection image display apparatus according to an embodiment of the present invention will be described with reference to the accompanying drawings. In the following description, the embodiment of the invention is described by exemplifying an active matrix liquid crystal display device using a thin film transistor (TFT) and a projection image display apparatus including the liquid crystal display device, to which the present invention is not limited, but the present invention is applicable to an active matrix liquid crystal display device using an MIM or a simple matrix liquid crystal display device.

Herein, a region of a liquid crystal display device corresponding to a "pixel", that is, a minimum unit for display, is designated as a "pixel region". In an active matrix liquid crystal display device, a pixel electrode and a counter electrode opposing the pixel electrode together define a pixel region. In a structure in which a black matrix is provided, strictly speaking, in a region to which a voltage is applied in accordance with a state to be displayed, a portion corresponding to an opening of the black matrix corresponds to a pixel region.

Figure 14:
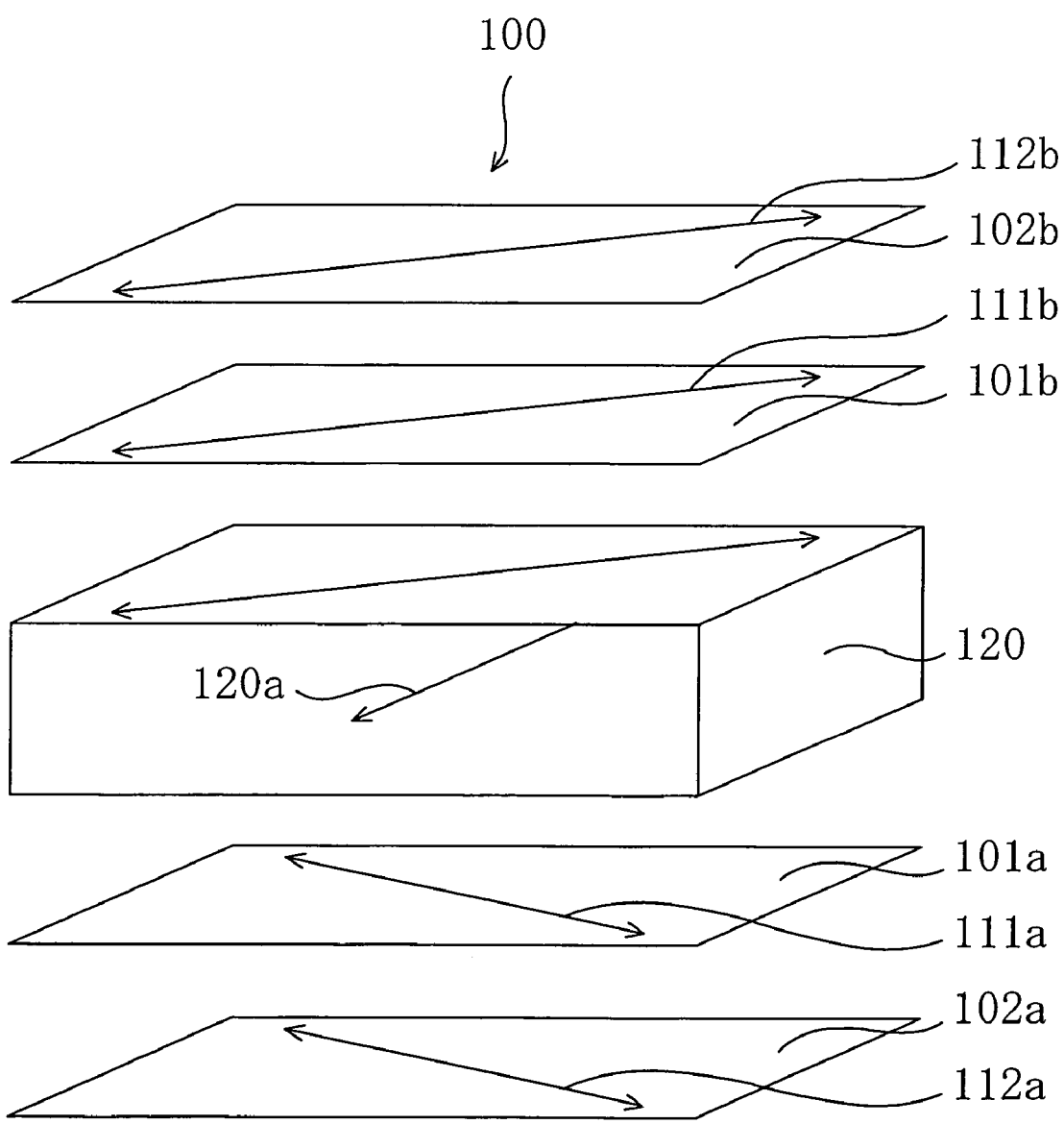
FIG. 14 is a schematic perspective view of a liquid crystal display device 100 according to an embodiment of the invention.
Figure 15:
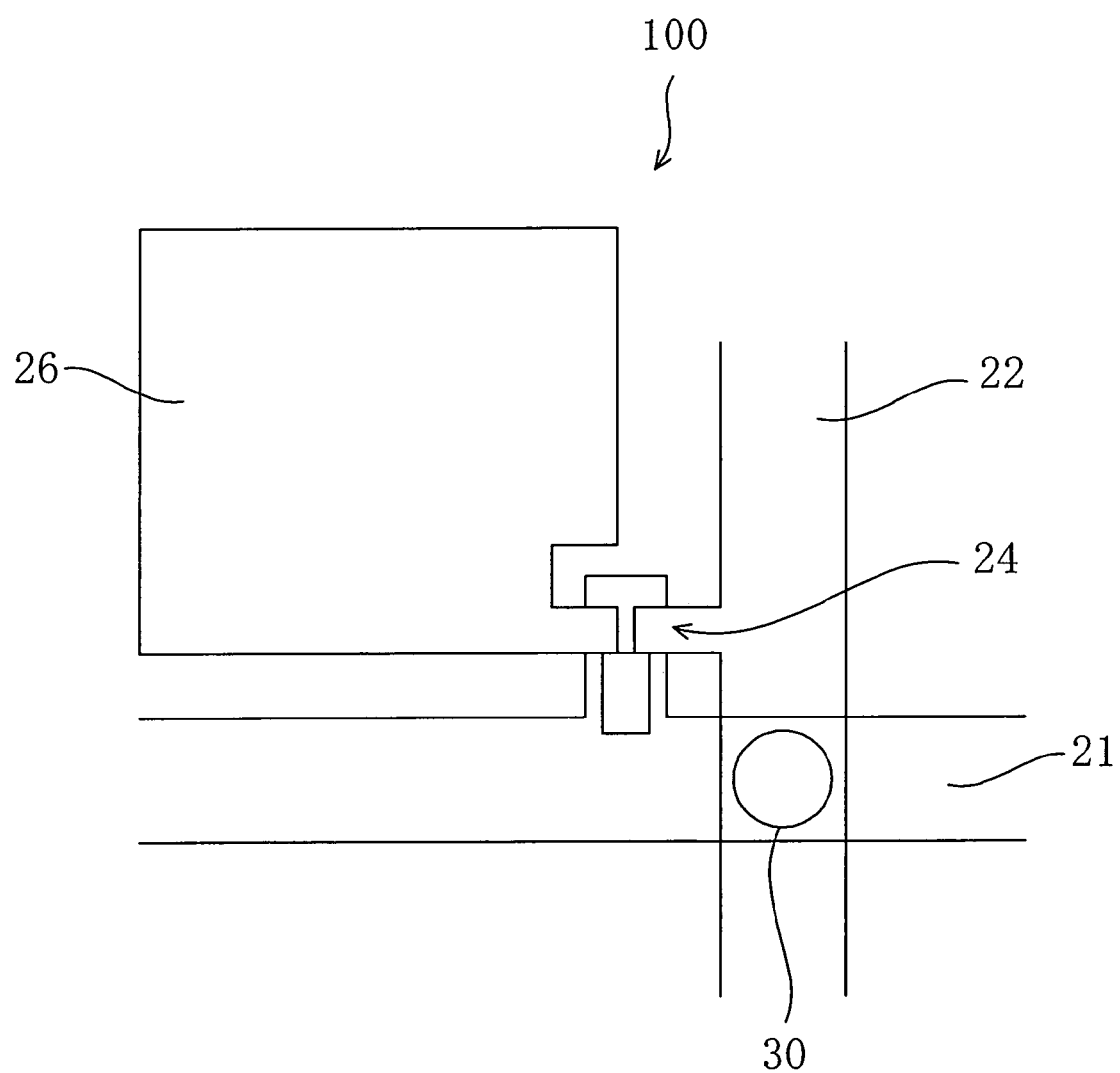
FIG. 15 is a schematic top view for showing the structure of one pixel region of the liquid crystal display device 100 according to an embodiment of the invention.

The structure of a liquid crystal display device 100 according to the embodiment of the invention will be described with reference to FIGS. 14 and 15. The liquid crystal display device 100 is a TN (twisted nematic) liquid crystal display device for producing display in the normally white mode. FIG. 14 is a schematic perspective view of the liquid crystal display device 100 according to the embodiment of the invention, and FIG. 15 is a schematic top view for showing the structure of one pixel region of the liquid crystal display device 100.

The liquid crystal display device 100 includes, as shown in FIG. 14, an active matrix substrate (hereinafter referred to as the "TFT substrate") 101*a*, a counter substrate (hereinafter also referred to as the "color filter substrate") 101*b*, a liquid crystal layer 120 provided between them, and a pair of polarizing plates 102*a* and 102*b* opposing each other with the liquid crystal layer 120 sandwiched therebetween and disposed so as to have their polarization axes 112*a* and 112*b* substantially orthogonal to each other.

In this case, the liquid crystal layer 120 is a horizontally oriented liquid crystal layer including liquid crystal molecules having positive dielectric anisotropy. A horizontally oriented liquid crystal layer means a liquid crystal layer in which liquid crystal molecules are oriented to have their molecular major axes parallel to a substrate face (on which an alignment film is typically provided) under application of no voltage. However, the liquid crystal molecules of this liquid crystal layer are not strictly parallel to the substrate but may be provided with pre-tilt for specifying a rising direction of the liquid crystal molecules. Also, in this case, the pair of polarizing plates 102*a* and 102*b* are provided outside the pair of substrates 101*a* and 101*b*.

Furthermore, the liquid crystal display device 100 includes column-shaped spacers (supporting bodies) 30 provided between the TFT substrate 101*a* and the counter substrate 101*b*. The spacers 30 keep a distance between the TFT substrate 101*a* and the counter substrate 101*b*. In other words, the thickness of the liquid crystal layer 120 is defined by the spacers 30. The spacers 30 are formed, for example, through photolithography process in desired positions.

The TFT substrate 101*a* includes, as shown in FIG. 15, a transparent substrate having an insulating property (such as a glass substrate; not shown), a TFT 24 provided, as a switching element, in each pixel region on the face of the transparent substrate facing the liquid crystal layer 120, a scanning line (gate bus line) 21 electrically connected to the gate electrode of the TFT 24, a signal line (source bus line) 22 electrically connected to the source electrode of the TFT 24, and a pixel electrode 26 electrically connected to the drain electrode of the TFT 24.

The scanning line 21 and the signal line 22 are provided so as to cross each other (typically at right angles). In a region outside the pixel region, and more specifically, on a crossing point between the scanning line 21 and the signal line 22, the spacer 30 for defining the thickness of the liquid crystal layer 120 is formed. In this embodiment, the spacer 30 is formed on every crossing point between the scanning line 21 and the signal line 22 in a mask region S outside the pixel region P.

The counter substrate 101*b* opposing the TFT substrate 101*a* includes a transparent substrate (such as a glass substrate) and a counter electrode provided on the face of the transparent substrate facing the liquid crystal layer 120. The counter electrode is, for example, a single solid electrode shared by all the pixels.

On the faces facing the liquid crystal layer 120 of the TFT substrate 101*a* and the counter substrate 101*b*, a pair of alignment films (not shown) are provided as an alignment layer. In this embodiment, these alignment films are horizontal alignment films that have been subjected to a uniaxial orientation treatment (such as a rubbing treatment) along directions shown with arrows 111a and 111b in FIGS. 14 and 16.

Figure 17:
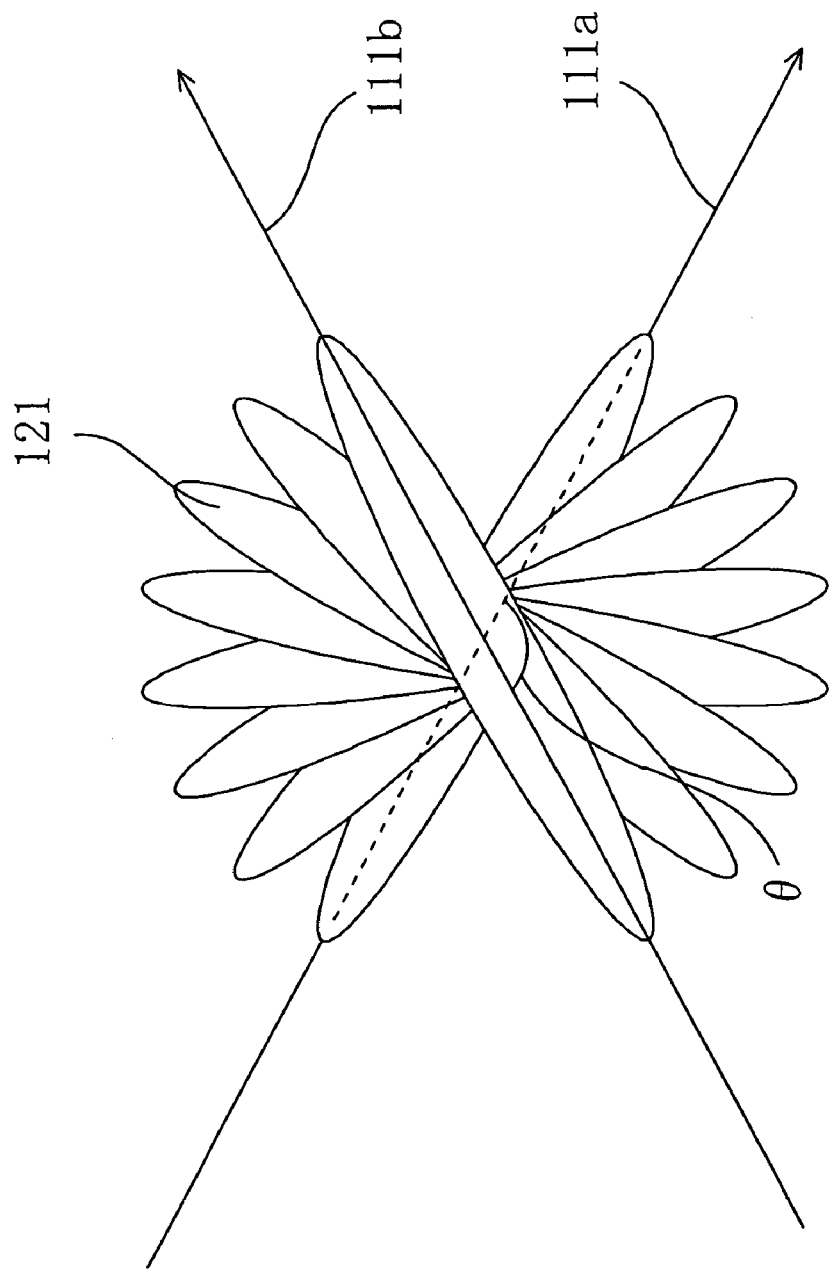
FIG. 17 is a schematic top view for showing orientation of twist oriented liquid crystal molecules 121.

In a general TN liquid crystal display device, the uniaxial orientation treatment is performed so as to attain a twist angle of the liquid crystal layer of 90°. However, in the liquid crystal display device 100 according to the embodiment of the invention, the uniaxial orientation treatment is performed so as to attain a twist angle of the liquid crystal layer 120 larger than 90°. In this embodiment, since the liquid crystal layer 120 is a horizontally oriented liquid crystal layer, the twist angle θ of the liquid crystal layer 120 is defined by a twist angle of the liquid crystal molecule 121 attained in the initial orientation state (under application of no voltage) as shown in FIG. 17. The liquid crystal layer 120 typically includes a chiral agent (an optical isomer).

Figure 16:
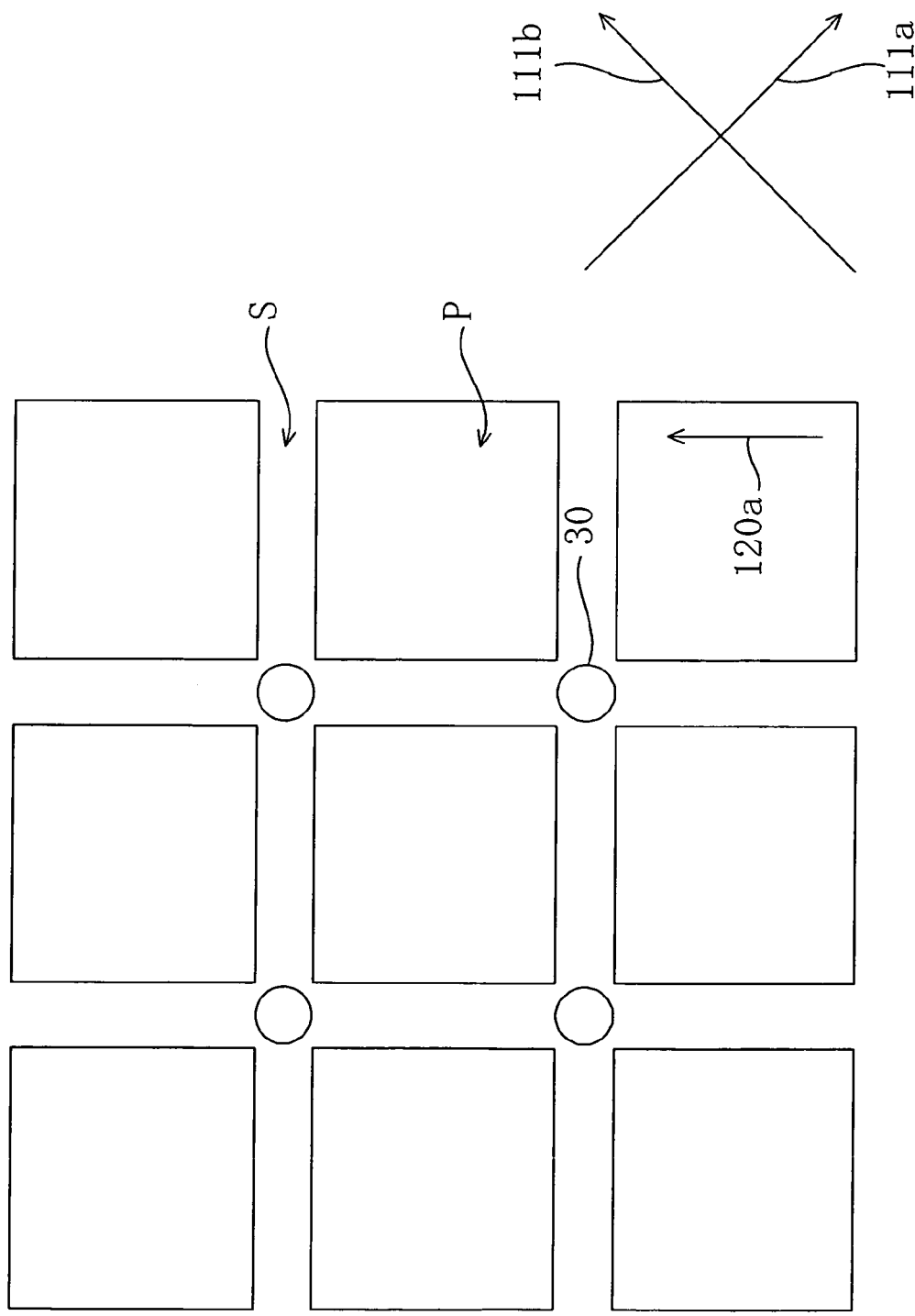
FIG. 16 is a schematic top view of the liquid crystal display device 100 according to the embodiment of the invention.
Figure 18:
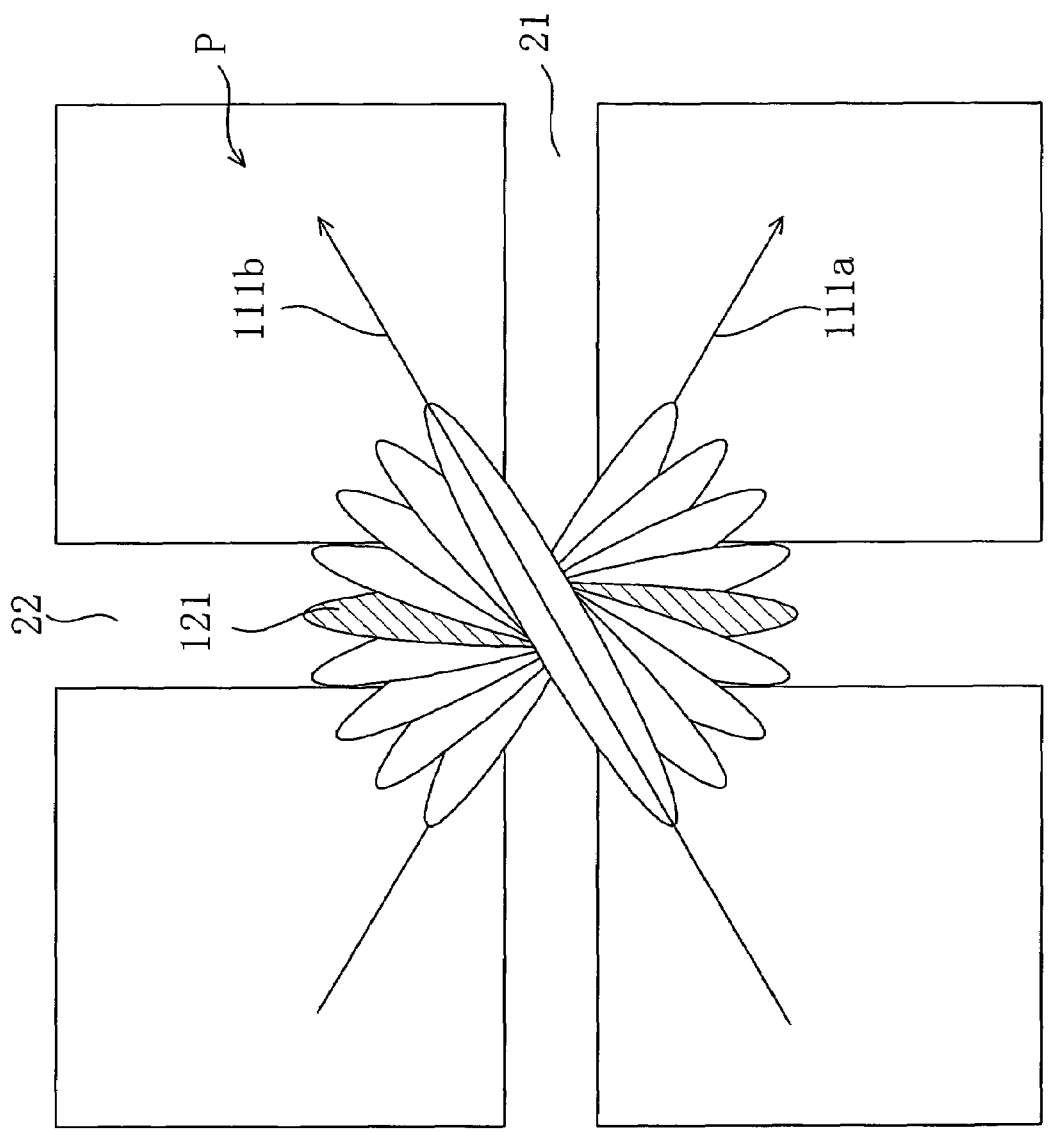
FIG. 18 is a schematic top view for showing orientation of the liquid crystal molecules 121 in the liquid crystal display device 100.

Furthermore, in this case, the uniaxial orientation treatment is performed so that an orientation axis direction 120a of the liquid crystal layer 120 can be substantially orthogonal to the scanning line 21 as shown in FIG. 16. The orientation axis direction is defined, as shown in FIG. 18, by the orientation direction (along the major axis) of a liquid crystal molecule 121 disposed in the vicinity of the center along the thickness direction of the liquid crystal layer 120 (and more strictly, defined by an azimuth angle direction of the orientation direction).

The present inventor has found, on the basis of finding obtained as a result of detailed examination of occurrence of light leakage in the vicinity of a spacer, that when the twist angle of the liquid crystal layer 120 is larger than 90° as in the liquid crystal display device 100, the light leakage derived from orientation turbulence of the liquid crystal layer 120 caused in the vicinity of the spacer can be suppressed.

Figure 19:
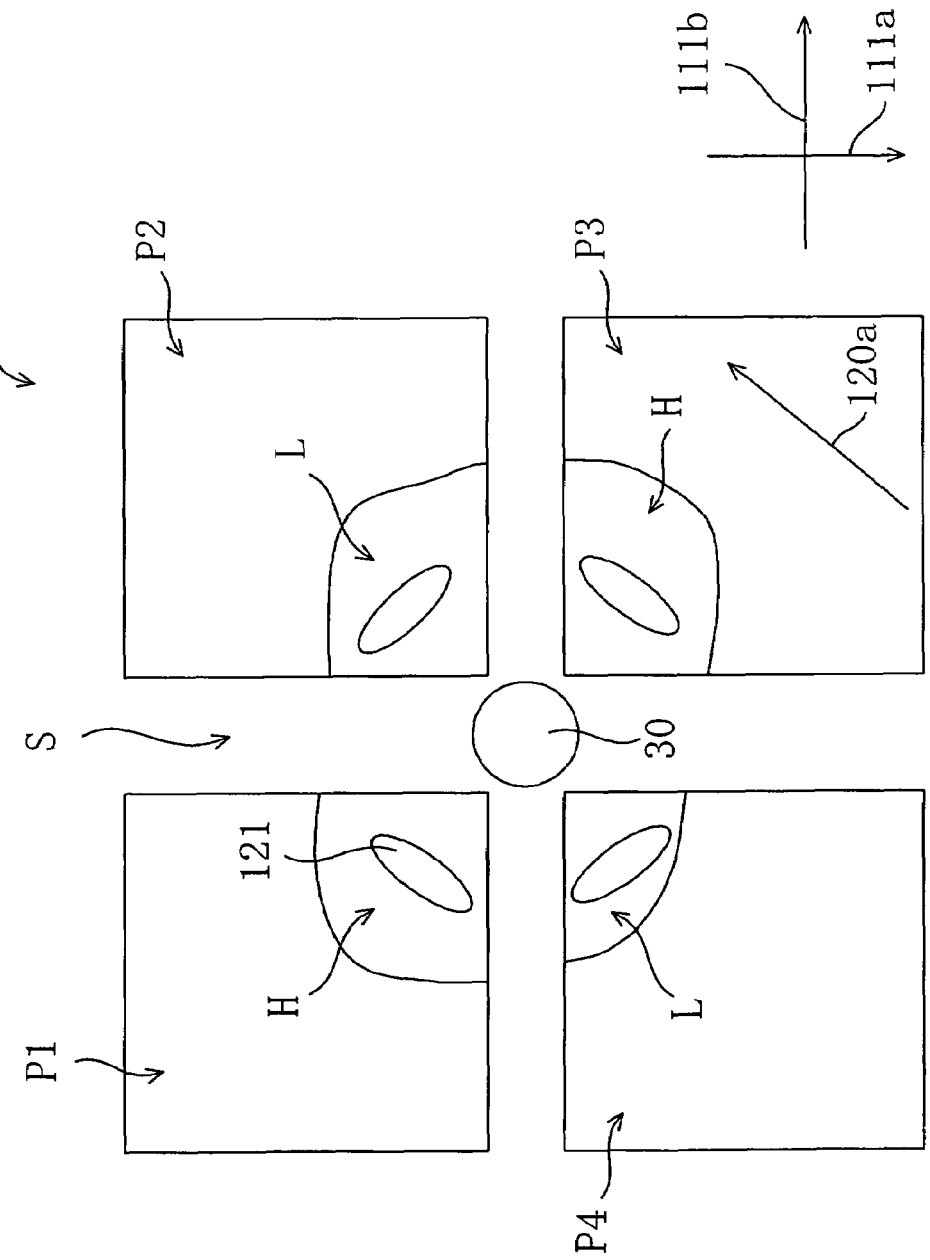
FIG. 19 is a schematic top view for showing occurrence of light leakage in the vicinity of a spacer in a conventional TN liquid crystal display device 600 in which the twist angle of a liquid crystal layer is set to 90°.

The finding about the occurrence of the light leakage obtained by the present inventor will now be described with reference to FIG. 19. FIG. 19 is a schematic top view of a portion in the vicinity of a spacer of a conventional TN liquid crystal display device 600 including a pair of polarizing plates disposed in a cross Nicols state and a liquid crystal layer with a twist angle set to 90°. In FIG. 19, the same reference numerals are used to refer to elements having substantially the same functions as those of the liquid crystal display device 100.

In a pixel region of the liquid crystal display device 600, a high brightness region H and a low brightness region L are caused in the vicinity of the spacer 30 as schematically shown in FIG. 19. The high brightness region H is a region in which the display brightness attained in dark display and intermediate gray scale display is higher than that in the other region, and the low brightness region L is a region in which the display brightness attained in dark display and intermediate gray scale display is lower than that in the other region. It is noted that the high brightness region H and the low brightness region L are conceptually shown in FIG. 19 and the high brightness region H and the low brightness region L are not always actually recognized as regions with clear outlines as shown in FIG. 19.

In the liquid crystal display device 600 including the liquid crystal layer containing liquid crystal molecules with positive dielectric anisotropy and producing display in the normally white mode, dark display is produced by applying a predetermined voltage through the liquid crystal layer so as to orient the liquid crystal molecules vertically to the substrate face. The retardation of the liquid crystal layer obtained in the dark display is preferably zero but actually cannot be zero, and merely slight retardation occurs. Herein, such retardation is designated as "residual retardation of the liquid crystal layer". The residual retardation occurs due to the following cause:

In the normally white mode using a liquid crystal layer including liquid crystal molecules with positive dielectric anisotropy, even when the retardation is made sufficiently small by applying a voltage through the liquid crystal layer, liquid crystal molecules disposed in the vicinity of the interface of the substrate are hardly affected by the electric field because of large interaction with the face having been subjected to the orientation treatment, and therefore, these liquid crystal molecules tend to keep the initial orientation. Accordingly, even though a sufficient voltage is applied, the retardation remains in the liquid crystal layer.

The direction of the residual retardation, namely, the slow axis of the liquid crystal layer obtained in the intermediate gray scale display and the dark display, substantially accords with the orientation direction of liquid crystal molecules disposed in the vicinity of the center along the thickness direction of the liquid crystal layer (namely, the orientation axis direction 120a of the liquid crystal layer) in the liquid crystal display device 600 including the horizontally oriented liquid crystal layer.

On the other hand, in a portion of the liquid crystal layer in the vicinity of the spacer 30, the orientation turbulence of the liquid crystal layer is caused due to the orientation regulating force of the surface of the spacer 30. When a sufficiently large voltage is applied through the liquid crystal layer, the liquid crystal molecules disposed in the vicinity of the center of the pixel region are oriented substantially vertical to the substrate face but the liquid crystal molecules disposed in the vicinity of the spacer 30 are not oriented vertically to the substrate face because of the orientation regulating force of the surface of the spacer 30 and are inclined against the normal direction of the substrate face. Accordingly, the liquid crystal molecules disposed in the vicinity of the spacer 30 have retardation even when a sufficiently large voltage is applied. Furthermore, the azimuth angle direction of the orientation direction of the liquid crystal molecules disposed in the vicinity of the spacer 30 depends upon the cross-sectional shape of the spacer 30, and when the spacer 30 has, for example, a substantially circular cross-section, the liquid crystal molecules disposed in the vicinity of the spacer 30 in the liquid crystal layer are oriented concentrically as shown in FIG. 19.

Therefore, in a region in which there highly probably exist liquid crystal molecules 121 oriented substantially parallel to the slow axis of the liquid crystal layer in the dark display (that substantially accords with the orientation axis direction 120a of the liquid crystal layer), the retardation derived from the liquid crystal molecules disposed in the vicinity of the spacer 30 is added to the residual retardation, and hence, such a region has larger retardation than the residual retardation, resulting in causing the high brightness region H. In contrast, in a region in which there highly probably exist liquid crystal molecules 121 oriented substantially orthogonal to the slow axis of the liquid crystal layer in the dark display, at least part of the residual retardation is canceled by the retardation derived from the liquid crystal molecules disposed in the vicinity of the spacer 30, and hence, such a region has smaller retardation than the residual retardation, resulting in causing the low brightness region L.

More specifically, in the liquid crystal display device 600, as shown in FIG. 19, the high brightness region H is formed in pixel regions P1 and P3 arranged around the spacer 30 along a direction orthogonal to the orientation axis direction 120a of the liquid crystal layer, and the low brightness region L is formed in pixel regions P2 and P4 arranged around the spacer 30 along a direction parallel to the orientation axis direction 120a of the liquid crystal layer.

As described above, in the liquid crystal display device 600, the high brightness region H and the low brightness region L are formed in the vicinity of the spacer 30, and the high brightness region H with high display brightness is observed as light leakage, resulting in lowering the contrast ratio.

Figure 20:
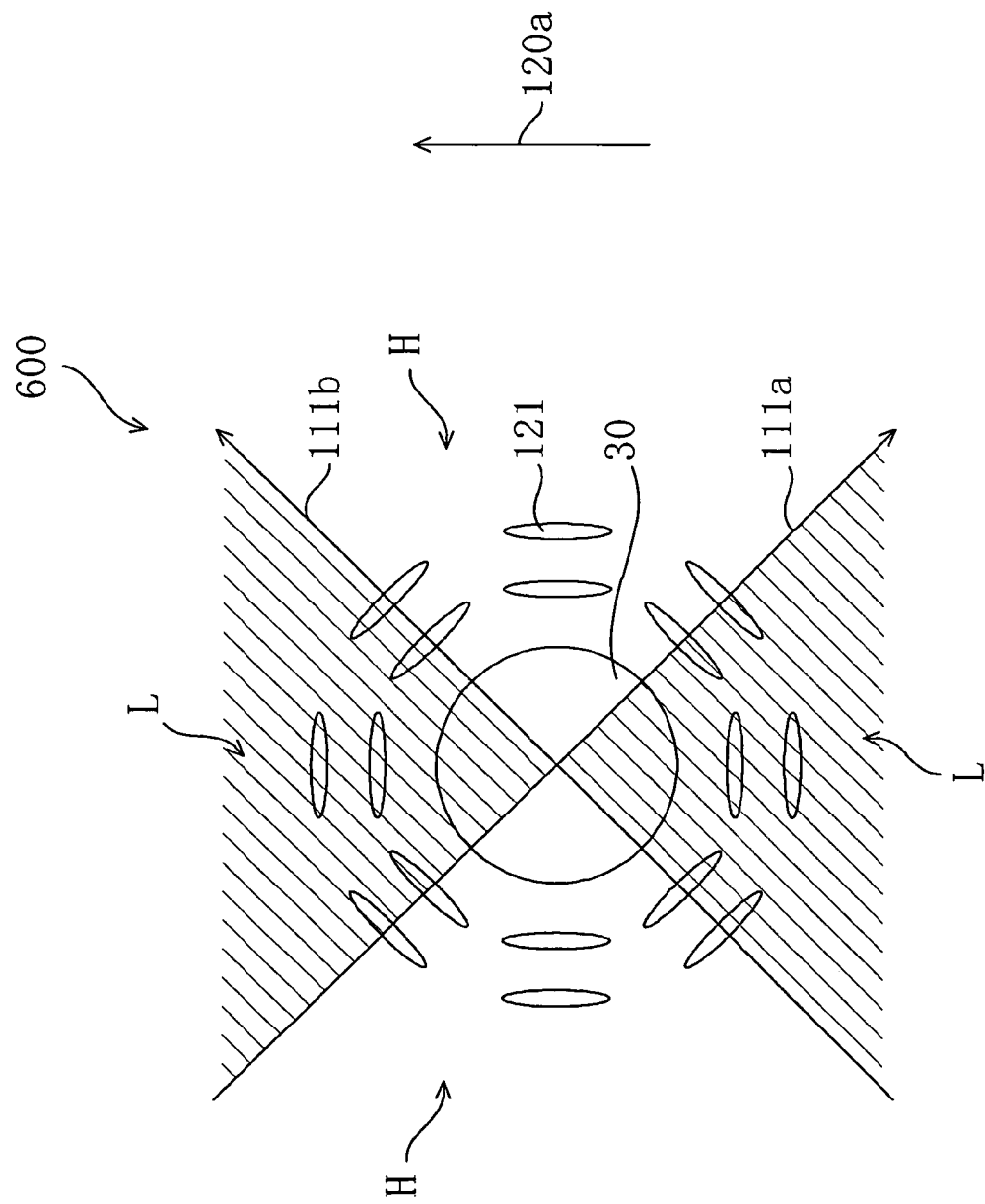
FIG. 20 is a schematic top view for showing occurrence of a high brightness region in the vicinity of a spacer in the conventional liquid crystal display device 600.
Figure 21:
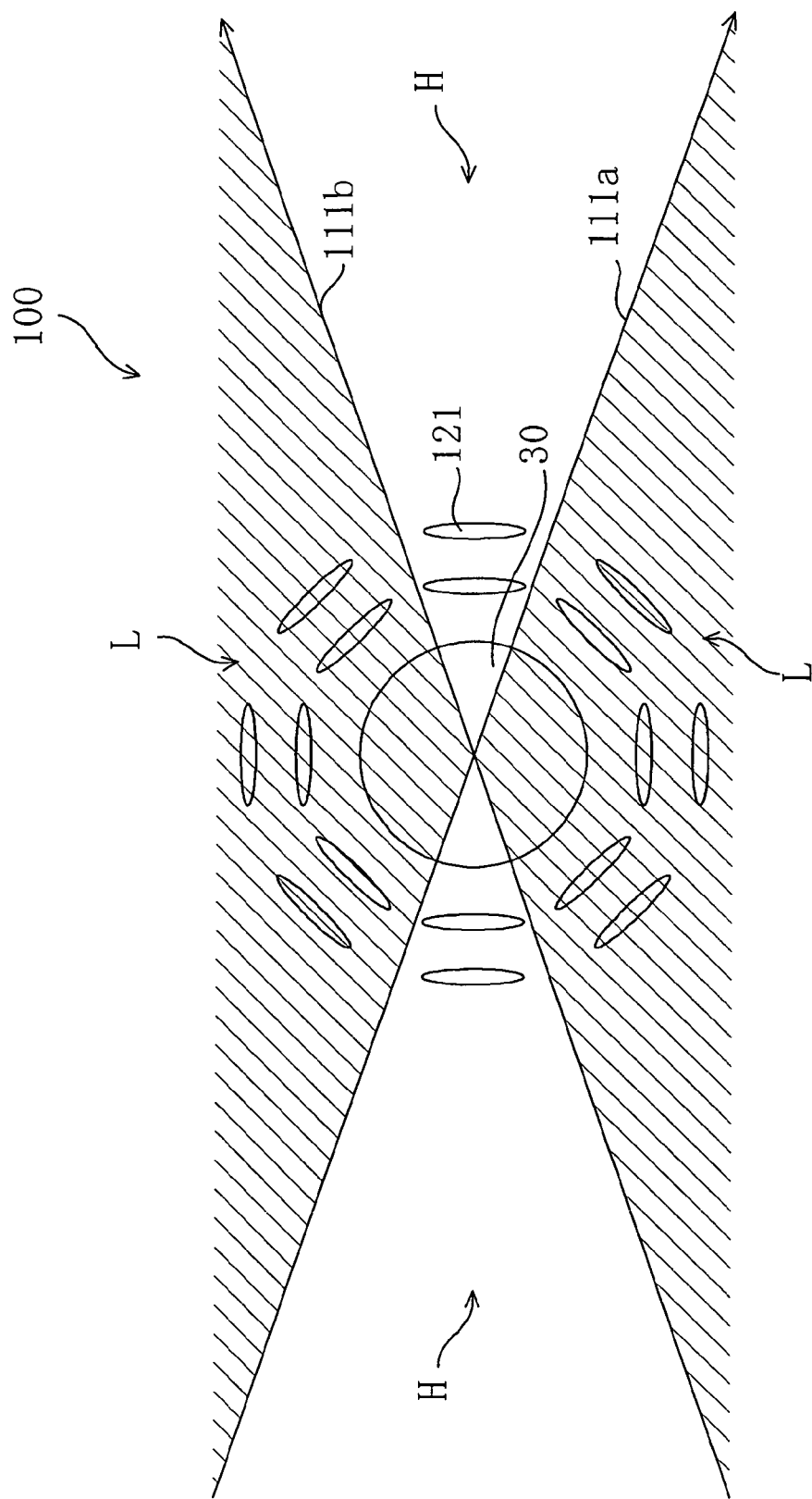
FIG. 21 is a schematic top view for showing the occurrence of a high brightness region in the vicinity of a spacer in the liquid crystal display device 100 according to an embodiment of the invention.

On the other hand, in the liquid crystal display device 100 of this embodiment, since the twist angle of the liquid crystal layer 120 is larger than 90°, as shown in FIG. 20, there less probably exist liquid crystal molecules 121 oriented parallel to the orientation axis direction 120a of the liquid crystal layer than in the liquid crystal display device 600 in which the twist angle of the liquid crystal layer is 90°. Therefore, the area of the high brightness region H is smaller as shown in FIG. 21. Accordingly, the occurrence of the light leakage is suppressed.

As described above, in the liquid crystal display device 100 according the present invention, since the twist angle of the liquid crystal layer 120 is larger than 90°, the occurrence of the light leakage is suppressed. Therefore, the lowering of the contrast ratio is suppressed/prevented. Also, since there is no need to provide a mask layer for masking a region where the light leakage is caused, the aperture ratio is not lowered, resulting in realizing bright display.

A method for fabricating the liquid crystal display device 100 of an embodiment of the present invention will now be described with reference to FIGS. 14, 15, 16 and the like.

First, a transparent substrate (such as a glass substrate) on which TFTs 24 serving as switching elements arranged in a matrix, scanning lines 21, signal lines 22 and pixel electrodes 22 electrically connected to the TFTs 24 and the like are formed is prepared. The TFTs 24 and the like can be formed on the transparent substrate by using a known method.

Next, on the transparent substrate on which the TFTs 24 and the like have been formed, a photosensitive resin is applied by using a spinner. Subsequently, the photosensitive resin is patterned through exposure using UV and subsequent development, so that portions working as spacers 30 alone can remain. Then, the remaining photosensitive resin is cured by heating, so as to form the spacers 30.

In this embodiment, a negative photosensitive acrylic resin is used as the photosensitive resin. Needless to say, a positive photosensitive acrylic resin or a negative or positive photosensitive polyimide resin may be used. Also, the material for the spacer 30 may be a non-photosensitive organic resin or a metal such as Cr, Mo or Al. In this case, it is necessary to perform exposure, development, etching and peeling after forming a photoresist layer on a layer of such a material applied on the substrate. Accordingly, from the viewpoint of simplification of the fabrication process and reduction of cost, the photosensitive resin is preferably used.

Also, in this case, as shown in FIGS. 15 and 16, each spacer 30 is formed outside the pixel region P, and more specifically, on each crossing point between the scanning lines 21 and the signal lines 22, but the position of the spacer 30 is not limited to this. The spacer 30 may be formed in a position other than the crossing point, may be formed in the pixel region P, or may be formed on the counter substrate 100b. However, when the spacer 30 is formed in the pixel region P, the display quality may be lowered. Therefore, from the viewpoint of producing high quality display, the spacer 30 is preferably formed outside the pixel region P.

Furthermore, although the spacer 30 in a substantially column-like shape is formed as shown in FIGS. 15 and 16 in this embodiment, the shape of the spacer 30 is not limited to this. The cross-sectional shape of the spacer 30 taken along the normal direction of the substrate face may be not only the substantially circular shape as shown in the drawings but also a substantially triangle shape, a substantially square shape or a substantially polygonal shape. Furthermore, the cross-sectional shape of the spacer 30 taken along an in-plane direction of the substrate may be not only the substantially square shape but also a trapezoid shape or a reverse trapezoid shape obtained by controlling a tapered shape.

Moreover, in this embodiment, substantially one spacer 30 is provided in every pixel region as shown in FIG. 16. Specifically, the number of spacers 30 adjacent to each pixel region is substantially constant in the display region. When such a structure is employed, the influence of the spacers 30 on the display is made substantially uniform in the respective pixel regions, and hence, uniform display can be produced over the whole display region. Needless to say, the structure is not limited to that shown in FIG. 16 in which substantially one spacer 30 is provided in every pixel region, but the same effect can be attained by employing a structure in which the number of spacers 30 adjacent to each pixel region (or disposed in each pixel region) is substantially constant in the display region.

On the transparent substrate on which the spacers 30 have been formed in the aforementioned manner, an alignment film material (such as polyimide) is applied by spin coating, and the resultant substrate is baked (at, for example, 180° C. for 1 hour), thereby forming an alignment film as an alignment layer. Thereafter, the alignment film is subjected to the uniaxial orientation treatment by the rubbing treatment. When the alignment film is formed so as to cover the spacers 30, namely, the alignment layer is formed after forming the spacers 30, as in this embodiment, the orientation regulating force of the alignment film can be prevented from lowering due to a diluting solvent, a developer and a repellent used in applying the material for the spacers 30, resulting in attaining good display quality. Thus, a TFT substrate (active matrix substrate) 100a is obtained.

Next, a counter substrate 100b on which a counter electrode and an alignment film have been formed is prepared. The counter electrode and the alignment film are formed by a known method.

The uniaxial orientation treatment performed on the alignment films of the TFT substrate 100a and the counter substrate 100b is carried out so as to attain the twist angle of the liquid crystal layer 120 larger than 90° (for example, so as to attain a twist angle of 92°).

Subsequently, the TFT substrate 100a and the counter substrate 100b are aligned to each other with a sealing part disposed around the display region. The sealing part is made from an epoxy adhesive including spacer spheres for keeping the cell gap.

Next, a liquid crystal material is injected into and sealed within a gap between the TFT substrate 100a and the counter substrate 100b, and thereafter, a pair of polarizing plates 102a and 102b and the like are provided. Thus, a liquid crystal display device 100 is obtained.

In the liquid crystal display device 100 fabricated in the aforementioned manner, even when it is placed in an intermediate gray scale display state or a dark display state by applying a voltage through the liquid crystal layer 120, a region in the vicinity of the spacer 30 where the light leakage is caused (i.e., a high brightness region) is formed substantially within the mask layer S outside the pixel region P (typically, on the black matrix), and therefore, the lowering of the contrast ratio can be suppressed/prevented. Also, since there is no need to provide a mask layer overlapping the pixel region P, a high aperture ratio can be realized, resulting in producing bright display.

Figure 22:
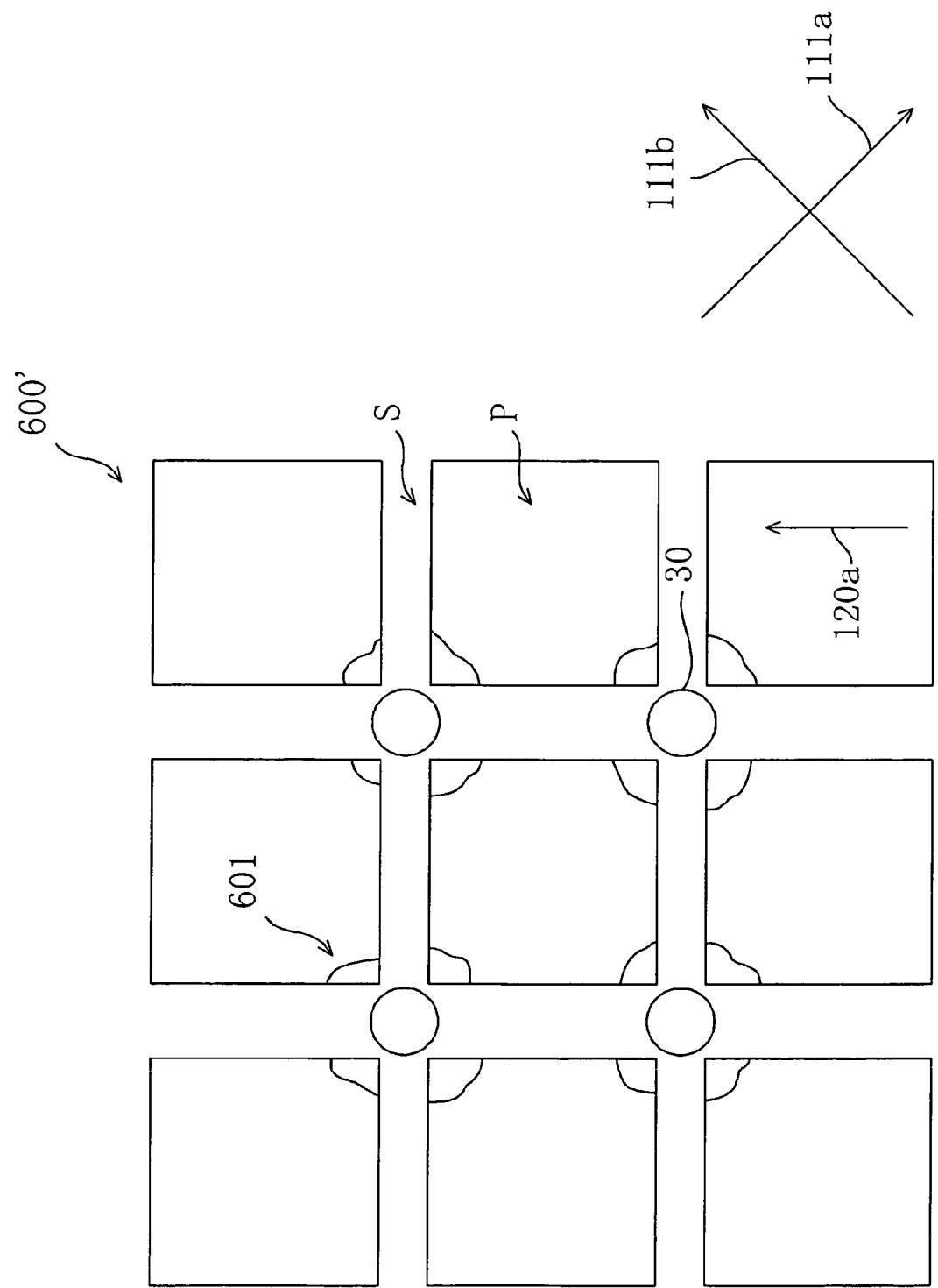
FIG. 22 is a schematic top view for showing occurrence of light leakage in the vicinity of a spacer in a liquid crystal display device 600' of a comparative example.

In contrast, in a liquid crystal display device 600' fabricated as a comparative example in a similar manner to the liquid crystal display device 100 except that the twist angle of the liquid crystal layer is set to 90°, a region where light leakage occurs is observed within the pixel region P in the vicinity of the spacer 30 as shown in FIG. 22.

In the description of the fabrication method, the twist angle of the liquid crystal layer 120 is exemplified as 92°, but the value of the twist angle is not limited to this but any value larger than 90° can be employed. However, when the twist angle is 180° or more, the twist direction cannot be uniquely determined, and it may be difficult to control the orientation. Therefore, from the viewpoint of properly controlling the orientation, the twist angle is preferably smaller than 180°. Also, as a result of examination made by the present inventor, it has been found that a high contrast ratio and good light-resisting reliability can be attained when the twist angle of the liquid crystal layer 120 is not less than 92° and not more than 120°.

Table 1 shows the occurrence of light leakage, contrast ratios and light-resisting reliability obtained by changing the twist angle of the liquid crystal layer 120. Also, Table 1 shows the content of a chiral agent (optical isomer) represented by d/p when the cell thickness is indicated by d and a twist pitch of liquid crystal molecules is indicated by p.

TABLE 1

| Twist angle | Chiral agent content (d/p) | Light leakage | Contrast ratio | Light-resisting reliability |
|---|---|---|---|---|
| 90° | 0.1 | caused | 150 | good |
| 92° | 0.125 | not caused | 350 | good |
| 96° | 0.25 | not caused | 400 | good |
| 102° | 0.5 | not caused | 450 | good |
| 110° | 0.65 | not caused | 450 | good |
| 115° | 0.7 | not caused | 450 | good |
| 120° | 1.0 | not caused | 430 | good |
| 130° | 1.0 | not caused | 400 | rather good |
| 150° | 1.0 | not caused | 430 | rather good |

As shown in Table 1, when the twist angle of the liquid crystal layer 120 is not less than 92° and not more than 120°, a high contrast ratio and good light-resisting reliability can be attained. The contrast ratio is lowered when the twist angle is too large because light leakage is caused due to an increased shift between the direction of the uniaxial orientation treatment of the alignment film and the transmission axis of the polarizing plates disposed in a cross Nicols state. Furthermore, the light-resisting reliability is lowered when the twist angle is too large because the content of the chiral agent is increased.

The liquid crystal display device 100 includes the horizontally oriented liquid crystal layer 120 in this embodiment, which does not limit the invention, but the invention is applicable to a liquid crystal display device including a twist oriented liquid crystal layer, and for example, is applicable also to a liquid crystal display device including a vertically oriented liquid crystal layer in which liquid crystal molecules are oriented substantially vertical to the substrate face under application of no voltage.

Herein, the "twist oriented liquid crystal layer" means a liquid crystal layer that can be placed in an orientation state where the major axis directions of the liquid crystal molecules are continuously changed along the thickness direction of the liquid crystal layer. In other words, the twist oriented liquid crystal layer includes not only a liquid crystal layer in which liquid crystal molecules are twist oriented under application of no voltage (in an initial orientation state) (such as what is called the TN liquid crystal layer) but also a liquid crystal layer in which liquid crystal molecules are twist oriented merely under application of a voltage.

Also in a liquid crystal display device including a vertically oriented liquid crystal layer, the light leakage can be suppressed and the contrast ratio can be improved by setting the twist angle of the liquid crystal layer to be larger than 90°.

The liquid crystal display device 100 is suitably used as a liquid crystal display device included in a projection image display apparatus because the lowering of the contrast ratio derived from the spacers 30 is suppressed and bright display can be produced.

Figure 23:
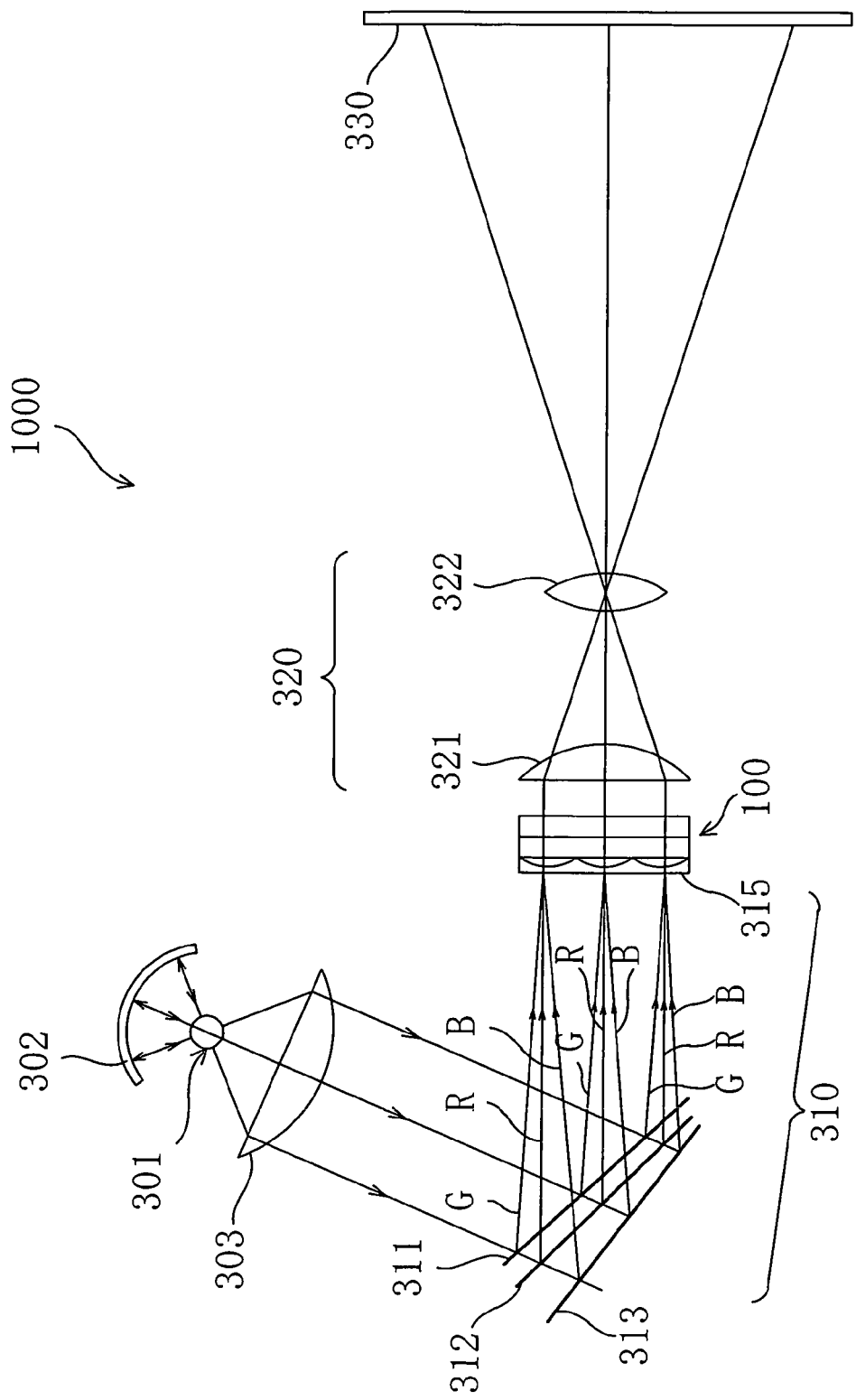
FIG. 23 is a schematic top view of a projection image display apparatus 1000 according to an embodiment of the invention.

FIG. 23 schematically shows a projection image display apparatus 1000 including the liquid crystal display device 100.

The projection image display apparatus 1000 includes the liquid crystal display device 100, a light source 301 for emitting light for the liquid crystal display device 100, light controlling means 310 for collecting the light from the light source 301 in corresponding pixel regions of the liquid crystal display device 100 in accordance with the wave ranges, and a projection optical system 320 for projecting light having been modulated by the liquid crystal display device 100 on a projection plane (such as a screen 330).

As the light source 301, a high pressure mercury lamp, a xenon lamp, a halogen lamp or the like can be used. Behind the light source 301, a spherical mirror 302 for reflecting, in a forward direction, light (white light) emitted backward from the light source 301 is provided, and a condenser lens 303 is provided in front of the light source 301. The spherical mirror 302 is arranged with its center according with the center of a light emitting portion of the light source 301, and the condenser lens 303 is arranged with its focal point according with the center of the light source 301. Through such arrangement, the light emitted from the light source 301 is changed into parallel light by the condenser lens 303.

The light controlling means 310 includes, in this case, dichroic mirrors 311, 312 and 313 disposed in front of the condenser lens 303 and a microlens array 315 adhered onto a substrate of the liquid crystal device 100 close to the light source 301.

The dichroic mirrors 311, 312 and 313 separate parallel luminous fluxes obtained by the condenser lens 303 into a plurality of luminous fluxes in accordance with their wave ranges. In this embodiment, the dichroic mirrors 311, 312 and 313 respectively selectively reflect green (G), red (R) and blue (B) light.

The light having been reflected by the dichroic mirrors 311, 312 and 313 (the R light, the G light and the B light) enter the microlens array 315 at different angles depending upon their wave ranges. The R light, the G light and the B light are respectively distributed to pixel regions corresponding to their wave ranges by appropriately setting the incident angles of the R light, the G light and the B light. The R light, the G light and the B light having passed through the microlens array 315 enter the pixel regions corresponding to their wave ranges at different incident angles.

In this embodiment, the dichroic mirrors 311, 312 and 313 and the microlens array 315 are used for collecting the light from the light source 301 in the corresponding pixel regions of the liquid crystal display device 100 in accordance with their wave ranges. Needless to say, another optical means can be used for this purpose.

The projection optical system 320 includes a field lens 321 and a projection lens 322 in this embodiment. The field lens 321 converges light from the liquid crystal display device 100 and allows the converged light to outgo toward the projection lens 322. The projection lens 322 enlarges and projects the light from the field lens 321 on the screen 330.

In general, in a projection image display apparatus, light emitted from a light source and passing through a liquid crystal display device is enlarged and projected by a projection lens on a screen. Therefore, display defect is easily visually recognized.

The projection image display apparatus 1000 of this embodiment includes the liquid crystal display device 100 and therefore, the lowering of the contrast ratio derived from the spacers is suppressed and bright display is realized.

Figure 24:
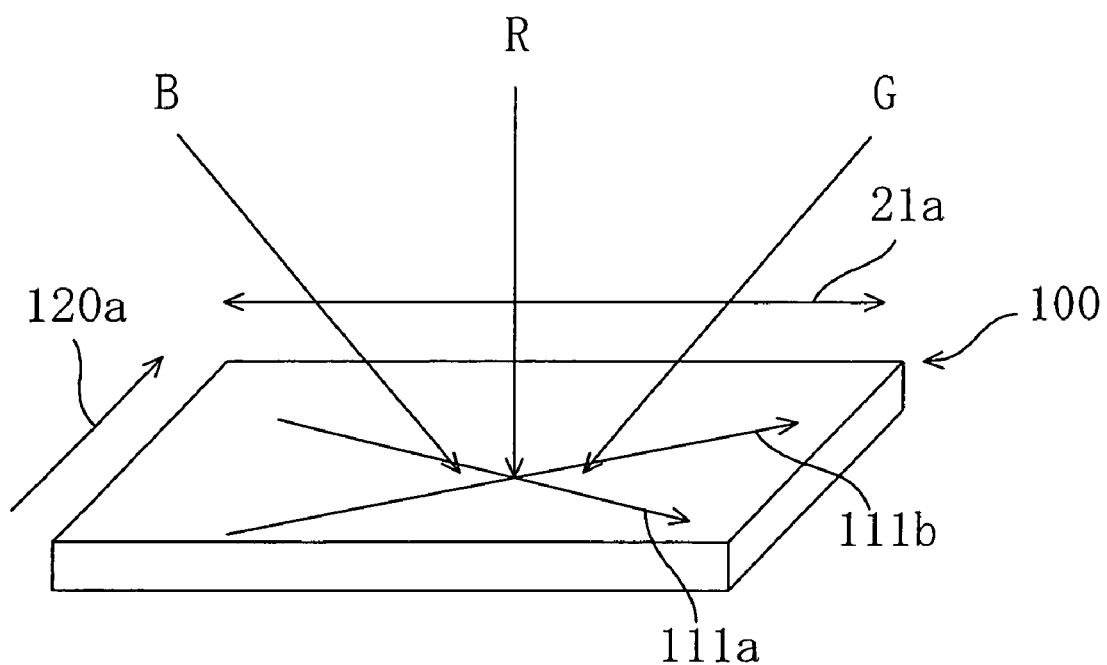
FIG. 24 is a schematic perspective view for showing luminous fluxes entering the liquid crystal display device 100 in the projection image display apparatus 1000 according to an embodiment of the invention.

In this embodiment, a structure in which a plurality of luminous fluxes (the R light, the G light and the B light) corresponding to the respective wave ranges enter the pixel regions of the liquid crystal display device 100 at different incident angles as shown in FIG. 24 is employed. When such a structure is employed, the orientation axis direction 120$a$ of the liquid crystal layer 120 included in the liquid crystal display device 100 is preferably substantially orthogonal to a plane parallel to the plural luminous fluxes. This is because when the orientation axis direction 120$a$ of the liquid crystal layer 120 is substantially orthogonal to the plane parallel to the plural luminous fluxes, the liquid crystal layer 120 is optically equivalent for the respective luminous fluxes, and hence, good display quality can be attained.

Typically, the plural luminous fluxes enter the pixel regions in parallel to an extending direction of the scanning line 21 or the signal line 22 electrically connected to the TFT 24. Therefore, the orientation axis direction 120$a$ of the liquid crystal layer 120 (defined as the orientation direction of the liquid crystal molecules disposed in the vicinity of the center along the thickness direction of the liquid crystal layer 120) is preferably substantially orthogonal to the extending direction of the scanning line 21 or the signal line 22.

For example, in the case where the plural luminous fluxes (the R light, the G light and the B light) enter the pixel regions in parallel to an extending direction 21$a$ of the scanning line 21 as shown in FIG. 24, the extending direction 21$a$ of the scanning line 21 is preferably substantially orthogonal to the orientation axis direction 120$a$ of the liquid crystal layer 120.

Although a single-plate type projection image display apparatus is exemplified in this embodiment, the liquid crystal display device 100 is suitably used in a three-plate type projection image display apparatus.

(Alternative Liquid Crystal Display Device)

Now, another liquid crystal device according to an embodiment of the invention will be described in detail with reference to the accompanying drawings.

Figure 25:
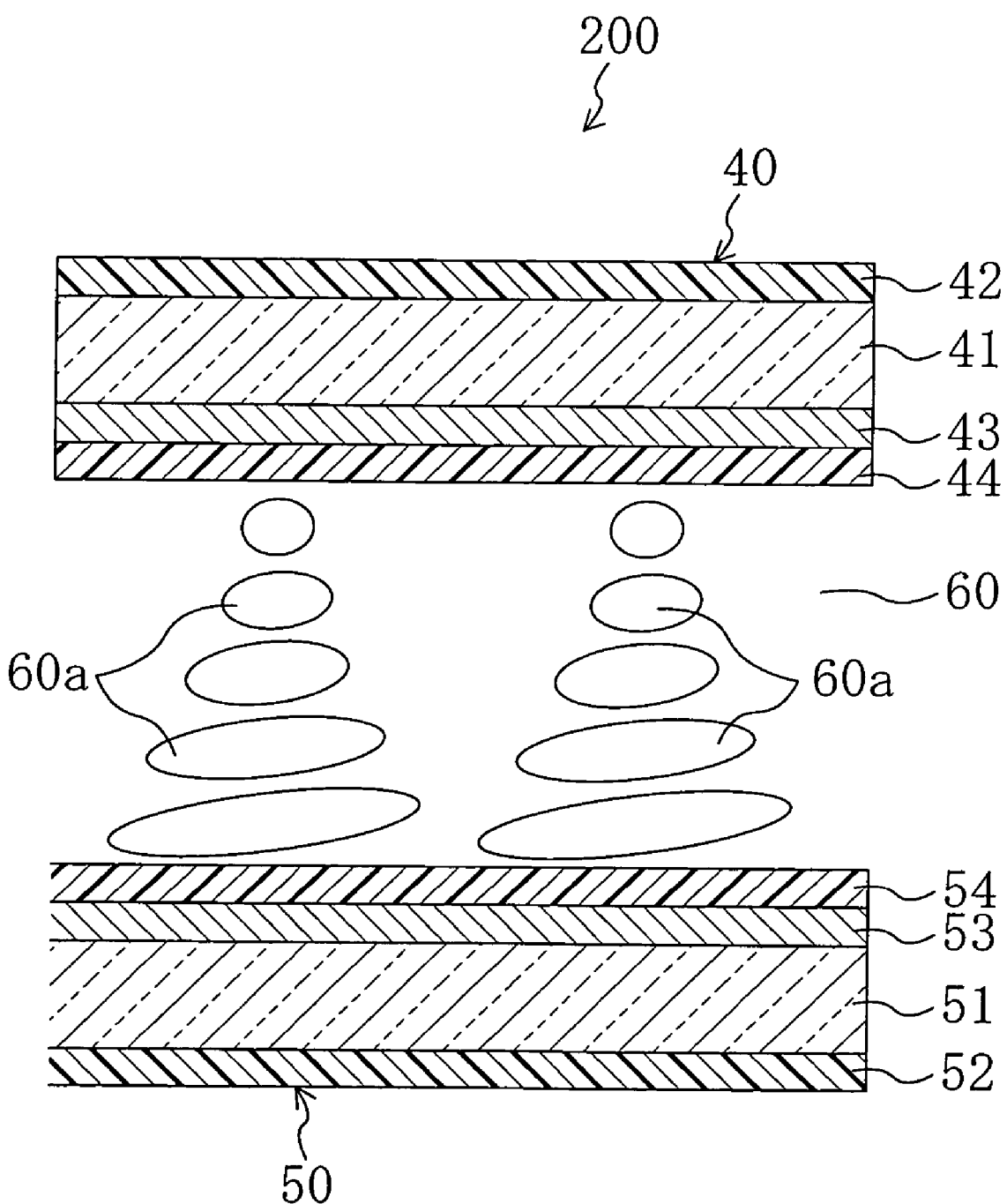
FIG. 25 is a rough cross-sectional view of another liquid crystal display device 200 according to an embodiment of the invention.

FIG. 25 shows the rough structure of a TN liquid crystal display device 200 according to an embodiment of the invention.

This liquid crystal display device 200 includes a pair of substrates 40 and 50 spaced and opposing each other, and a liquid crystal layer 60 made of nematic liquid crystal 60$a$ and sandwiched between the pair of substrates 40 and 50.

Each of the pair of substrates 40 and 50 is a multilayered structure including a glass or plastic substrate body 41 or 51, a polarizing device 42 or 52 stacked on the outer face of the substrate body, and an electrode 43 or 53 and an alignment film 44 or 54 successively stacked on the face of the substrate body facing the liquid crystal layer 60. The pair of substrates 40 and 50 are aligned to each other with a sealing material not shown, and spacers of plastic beads or the like are provided between the substrates so as to make uniform the gap therebetween.

The polarizing devices 42 and 52 transmit light in a give polarization state alone, and are provided on the corresponding substrates 40 and 50 so as to have their absorption axes orthogonal to each other. Also, the nematic liquid crystal 60$a$ is provided with respect to the absorption axis directions of the polarizing devices 42 and 52 in such a manner that the direction of a director of the nematic liquid crystal 60$a$ disposed in an intermediate portion of the liquid crystal layer 60 is inclined against the absorption axes of the polarizing devices 42 and 52 by approximately 45°.

The electrodes 43 and 53 are made from ITO (an indium tin oxide) or the like, that is, a transparent conductor, and apply a voltage for changing the orientation state of the nematic liquid crystal 60$a$ of the liquid crystal layer 60.

The alignment films 44 and 54 are made from a polyimide-based polymer or the like and regulate the orientation direction of the nematic liquid crystal 60$a$ of the liquid crystal layer 60, and the surfaces thereof are subjected to the rubbing treatment for this purpose.

The liquid crystal layer 60 is made of the nematic liquid crystal 60$a$, and its twist angle $\theta$ (°) peculiar to the material is 180 through 220. At this point, when the thickness of the liquid crystal layer 60 is indicated by d (μm) and a twist pitch (natural chiral pitch) peculiar to the material of the nematic liquid crystal 60$a$ is indicated by p (μm), the twist angle $\theta$ (°) peculiar to the material of the nematic liquid crystal 60$a$ is represented as $\theta = 360 \times d/p$ (°). Also, the rotational viscosity $\gamma_1$ (Pa·s) at 40° C. and the refraction index anisotropy $\Delta n$ and the dielectric anisotropy $\Delta \in$ against light of a wavelength of 550 nm of the nematic liquid crystal 60$a$ respectively satisfy $\gamma_1 \leq 0.1$, $0.14 \leq \Delta n \leq 0.18$ and $8 \leq \Delta \in \leq 12$.

The nematic liquid crystal 60$a$ of the liquid crystal layer 60 is set so as to satisfy a relationship, between a twist angle $\phi$ (°) specified by the alignment films 44 and 54 and the twist angle $\theta$ (°) peculiar to the material, of:

$$0.075 \times \theta + 84 \leq \phi \leq 0.075 \times \theta + 96 \tag{A}$$

and more preferably, a relationship of:

$$0.075 \times \theta + 88 \leq \phi \leq 0.075 \times \theta + 92 \tag{B}$$

Specifically, the alignment films are subjected to the rubbing treatment for orienting the nematic liquid crystal 60$a$, and the direction of the treatment is determined so as to satisfy the above-described formula (A) or (B).

In the liquid crystal display device 200 having the aforementioned structure, the twist angle $\theta$ (°) peculiar to the material of the nematic liquid crystal 60$a$ is set to satisfy $180 \leq \theta \leq 220$, thereby increasing a response speed attained in turning the voltage off. Also, since the twist angle $\phi$ (°) of the nematic liquid crystal 60$a$ specified by the alignment films 44 and 54 is set to have the relationship satisfying the formula (A) or (B) with the twist angle $\theta$ (°) peculiar to the material of the nematic liquid crystal 60$a$, high contrast can be attained without increasing a driving voltage.

Furthermore, since the rotational viscosity $\gamma_1$ (Pa·s) at 40° C. of the nematic liquid crystal 60a is set to satisfy $\gamma \leq 0.1$, a high response speed can be attained in turning the voltage off.

In this embodiment, the twist angle $\theta$ (°) peculiar to the material of the nematic liquid crystal 60a is set to satisfy $180 \leq \theta \leq 220$, to which the twist angle is not limited, but the twist angle may be set to satisfy $0 \leq \theta \leq 220$, $18 \leq \theta \leq 220$, $45 \leq \theta \leq 220$, $90 \leq \theta \leq 220$ or $135 \leq \theta \leq 220$.

EXAMPLES

Experiment 1

Method for Experiment

With respect to a liquid crystal display device having the same structure as that of the above-described embodiment, simulation was carried out for examining the relationship between the twist angle $\theta$ (°) peculiar to the material of the nematic liquid crystal and the twist angle $\phi$ (°) specified by the alignment film.

In the simulation, parameters of the liquid crystal were set as follows: the dielectric constant $\in_\parallel$ along the molecular axis direction of the liquid crystal=14; the dielectric constant $\in_\perp$ along a direction orthogonal to the molecular axis direction=4; the spread elastic coefficient K11=11 (pN); the twist elastic coefficient K22=6 (pN); the bend elastic coefficient K33=13 (pN); and the anisotropic refractive index $\Delta n$=0.15 (at a wavelength of 550 nm). Parameters of the liquid crystal display device were set as follows: the cell gap d of the liquid crystal layer=3 (μm); and the pre-tilt angle=3 (°). The polarizing devices were set so as to sandwich the liquid crystal layer and have their polarization directions orthogonal to each other. The wavelength employed for calculation was 550 nm.

Under the aforementioned setting, contrasts attained when the twist angle $\phi$ (°) was changed with the twist angle $\theta$ (°) set to 18, 45, 90, 135 and 180 were obtained. Also, with respect to the contrast of 100, 1000 and 10000, the twist angle $\theta$ (°) was obtained with the twist angle $\phi$ (°) changed. The contrast was obtained as (the transmittance attained with a voltage of 0 V applied through the liquid crystal)/(the transmittance attained with a voltage of 4.5 V applied through the liquid crystal).

Result of Experiment

Figure 26:
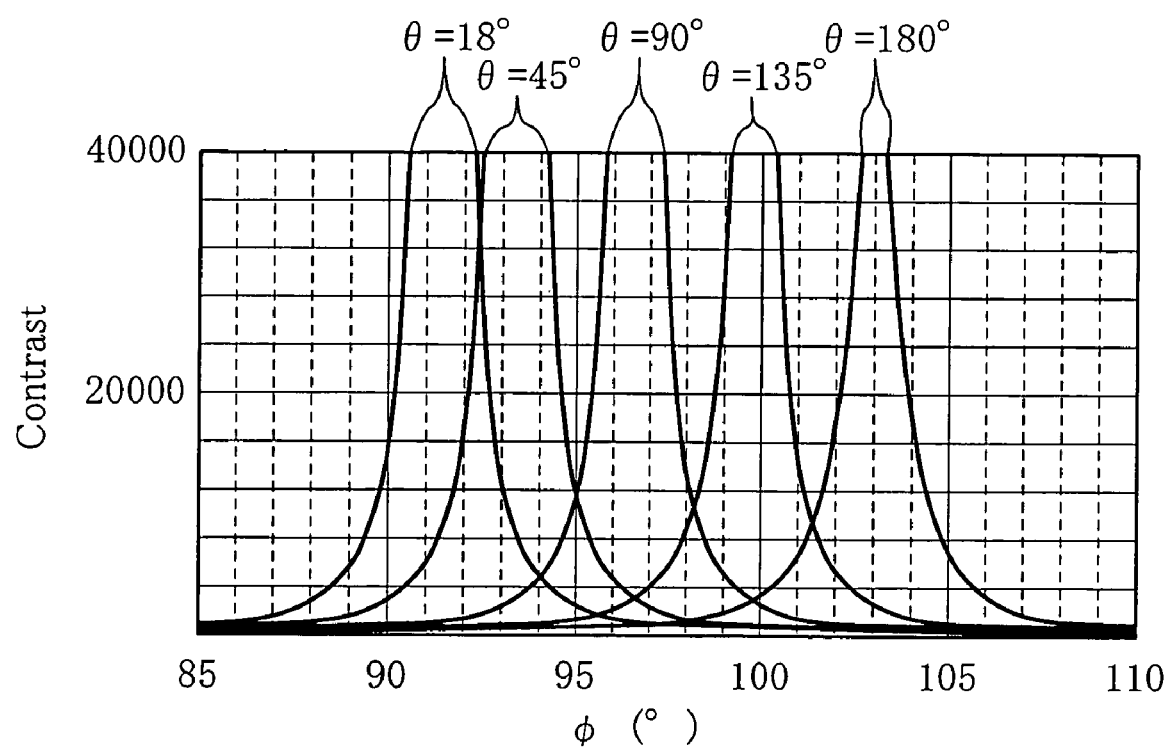
FIG. 26 is a graph for showing the relationship between a twist angle $\phi$ (°) of nematic liquid crystal specified by an alignment film and the contrast.

FIG. 26 shows the relationship between the twist angle $\phi$ (°) and the contrast obtained at each twist angle $\theta$ (°).

It is understood from FIG. 26 that there is a twist angle $\phi$ (°) for attaining the maximum contrast at each twist angle $\theta$ (°). For example, in the case where $\theta$=18 (°), the contrast is the maximum when $\phi \approx 91.3$ (°). Similarly, the maximum contrast is obtained at $\phi \approx 93.3$ (°) when $\theta$=45 (°), at $\phi \approx 96.5$ (°) when $\theta$=90 (°), at $\phi \approx 99.7$ (°) when $\theta$=135 (°) and at $\phi \approx 103$ (°) when $\theta$=180 (°).

Figure 27:
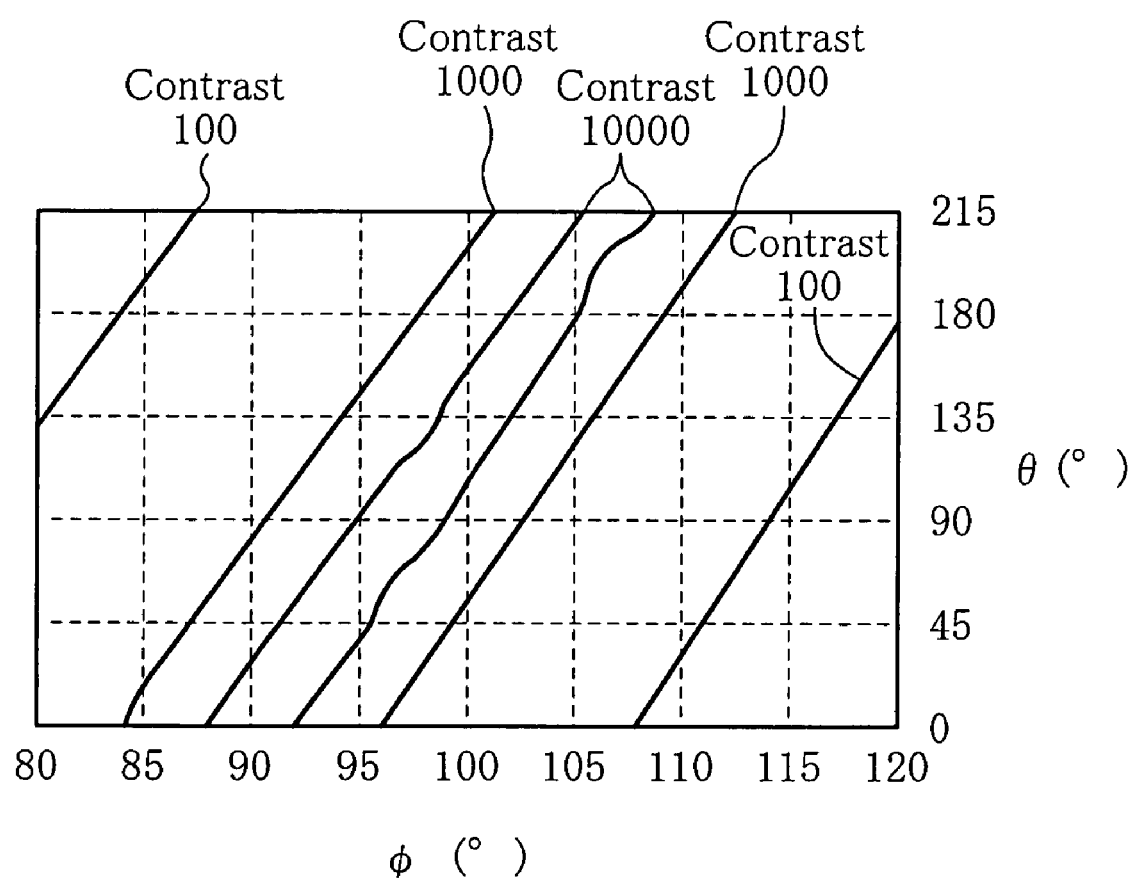
FIG. 27 is a graph for showing the relationship between the twist angle $\phi$ (°) of nematic liquid crystal specified by an alignment film and a twist angle $\theta$ (°) peculiar to the material of the nematic liquid crystal.

In order to make further detailed examination, the contrast was simulated with respect to the following ranges of the twist angles $\theta$ (°) and $\phi$ (°): $80 \leq \phi \leq 120$ and $0 \leq \theta \leq 220$. FIG. 27 shows contours of the contrast.

It is understood from FIG. 27 that there is a twist angle $\phi$ (°) for attaining the maximum contrast at each twist angle $\theta$ (°). Furthermore, it is understood that the condition for attaining contrast of 1000 or more substantially accords with the range defined by the formula (A). Also, it is understood that the condition for attaining contrast of 10000 or more substantially accords with the range defined by the formula (B).

In a TN liquid crystal display device currently used in a notebook PC, a liquid crystal monitor or the like, polarized light is disturbed due to factors other than a liquid crystal layer (such as a color filter, a polarizing film and plastic beads included in the liquid crystal layer), and hence, the contrast is approximately 500. In consideration of this, the contrast of the liquid crystal layer itself should be approximately 1000 or more and preferably 10000 or more, and the conditions for attaining these contrasts respectively correspond to the conditions defined by the formulas (A) and (B).

In this manner, when the response speed is to be improved by setting the twist angle $\theta$ (°) peculiar to the nematic liquid crystal to be large, sufficient contrast can be attained by setting the twist angle $\phi$ (°) of the nematic liquid crystal specified by the alignment film within the range defined by the formula (A) and preferably the range defined by the formula (B), and therefore, there is no need to increase the driving voltage.

This result is not obtained merely under the setting of the simulation of Experiment 1. It has been confirmed, in a general TN mode, that when a voltage higher than the optical threshold voltage by approximately three through eight times is used as the driving voltage, a result substantially equivalent to that shown in FIGS. 26 and 27 can be attained.

Experiment 2

Liquid crystal display devices according to the following examples each having a similar structure to that of the aforementioned embodiment were fabricated so as to measure the contrasts thereof. Also, response speeds attained in turning the voltage off (in reducing a voltage of 4.5 V to a voltage of 0 V) were measured.

Example 1

A liquid crystal display device in which a nematic liquid crystal material having physical property parameters equivalent to those set in the simulation of Experiment 1 was used, a cell gap d (μm) of a liquid crystal layer was 3.0 (μm), and an alignment film is subjected to the rubbing treatment for attaining a twist pitch (natural chiral pitch) p (μm) peculiar to the material of the nematic liquid crystal of ∞ (μm), namely, for attaining a twist angle $\theta$ (°) peculiar to the nematic liquid crystal of 0 (°) on the basis of $\theta=360 \cdot d/p$ (°), and for attaining a twist angle $\phi$ (°) specified by the alignment film of 90 (°) was fabricated as a liquid crystal display device of Example 1. It is noted that a combination of $\theta$=0 (°) and $\phi$=90 (°) satisfies both the formula (A) and the formula (B).

The contrast of this liquid crystal display device was found through measurement to be approximately 720. This value of the contrast of approximately 720 is smaller than a value read in FIGS. 26 and 27, and this is probably because of factors other than the liquid crystal layer (such as polarizing devices, plastic beads and the like).

Example 2

A liquid crystal display device in which a nematic liquid crystal material having physical property parameters equivalent to those set in the simulation of Experiment 1 was used, a cell gap d (μm) of a liquid crystal layer was 3.0 (μm), and a chiral dopant (S-811: manufactured by Merck) was added to the liquid crystal layer for attaining a twist pitch (natural chiral pitch) p (μm) peculiar to the material of the nematic liquid crystal of 60 (μm), namely, for attaining a twist angle θ (°) peculiar to the nematic liquid crystal of 18 (°) on the basis of θ=360·d/p (°), and an alignment film was subjected to the rubbing treatment for attaining a twist angle φ (°) specified by the alignment film of 90 (°) was fabricated as a liquid crystal display device of Example 2. It is noted that a combination of θ=18 (°) and φ=90 (°) satisfies both the formula (A) and the formula (B).

The contrast of this liquid crystal display device was found through measurement to be approximately 700. This value of the contrast of approximately 700 is smaller than a value read in FIGS. 26 and 27, and this is probably because of factors other than the liquid crystal layer (such as polarizing devices, plastic beads and the like).

Also, the response speed attained in turning the voltage off of this liquid crystal display device was shorter by approximately 6% than that attained in Example 1 where θ=0 (°).

Example 3

A liquid crystal display device having the same structure as that of Example 1 except that a chiral dopant (S-811: manufactured by Merck) was added to the liquid crystal layer for attaining a twist pitch (natural chiral pitch) p (μm) peculiar to the material of the nematic liquid crystal of 24 (μm), namely, for attaining a twist angle θ (°) peculiar to the nematic liquid crystal of 45 (°) on the basis of θ=360·d/p (°), was fabricated as a liquid crystal display device of Example 3. It is noted that a combination of θ=45 (°) and φ=90 (°) satisfies the formula (A) but does not satisfy the formula (B).

The contrast of this TN liquid crystal display device was found through measurement to be approximately 440. This value of the contrast is smaller than a value read in FIGS. 26 and 27, and this is probably because of factors other than the liquid crystal layer (such as polarizing devices, plastic beads and the like).

As is understood from comparison with Example 2, the contrast is lowered by increasing the twist angle θ (°).

Also, the response speed attained in turning the voltage off of this liquid crystal display device was shorter by approximately 16% than that attained in Example 1 where θ=0 (°). This response speed is shorter than that attained in Example 2 where θ=18 (°).

Example 4

A liquid crystal display device having the same structure as that of Example 3 except that an alignment film was subjected to the rubbing treatment for attaining a twist angle φ (°) of the nematic liquid crystal specified by the alignment film of 93 (°) was fabricated as a liquid crystal display device of Example 4. It is noted that a combination of θ=45 (°) and φ=93 (°) satisfies both the formula (A) and the formula (B).

The contrast of this TN liquid crystal display device was found through measurement to be approximately 680. This value of the contrast is smaller than a value read in FIGS. 26 and 27, and this is probably because of factors other than the liquid crystal layer (such as polarizing devices, plastic beads and the like).

As is understood from comparison with Example 3, the contrast is improved by changing the twist angle φ (°) from 90 (°) to 93 (°) when θ=45 (°).

Also, the response speed attained in turning the voltage off of this liquid crystal display device was shorter by approximately 12% than that attained in Example 1 where θ=0 (°). This response speed is shorter than that attained in Example 2 where θ=18 (°).

Example 5

A liquid crystal display device having the same structure as that of Example 3 except that an alignment film was subjected to the rubbing treatment for attaining a twist angle φ (°) of the nematic liquid crystal specified by the alignment film of 96 (°) was fabricated as a liquid crystal display device of Example 5. It is noted that a combination of θ=45 (°) and φ=96 (°) satisfies the formula (A) but does not satisfy the formula (B).

The contrast of this TN liquid crystal display device was found through measurement to be approximately 430. This value of the contrast is smaller than a value read in FIGS. 26 and 27, and this is probably because of factors other than the liquid crystal layer (such as polarizing devices, plastic beads and the like).

As is understood from comparison with Examples 3 and 4, the contrast is lowered by changing the twist angle φ from 90 or 93 (°) to 96 (°) when θ=45 (°)

Also, the response speed attained in turning the voltage off of this liquid crystal display device was shorter by approximately 8% than that attained in Example 1 where θ=0 (°). This response speed is shorter than that attained in Example 2 where θ=18 (°).

Example 6

A liquid crystal display device having the same structure as that of Example 1 except that a chiral dopant (S-811: manufactured by Merck) was added to the liquid crystal layer for attaining a twist pitch (natural chiral pitch) p (μm) peculiar to the material of the nematic liquid crystal of 12 (μm), namely, for attaining a twist angle θ (°) peculiar to the nematic liquid crystal of 90 (°) on the basis of θ=360·d/p (°), was fabricated as a liquid crystal display device of Example 6. It is noted that a combination of θ=90 (°) and φ=90 (°) satisfies neither the formula (A) nor the formula (B).

The contrast of this TN liquid crystal display device was found through measurement to be approximately 250. This value of the contrast is smaller than a value read in FIGS. 26 and 27, and this is probably because of factors other than the liquid crystal layer (such as polarizing devices, plastic beads and the like).

As is understood from comparison with Examples 1, 2 and 3, the contrast is lowered by increasing the twist angle θ (°).

Also, the response speed attained in turning the voltage off of this liquid crystal display device was shorter by approximately 28% than that attained in Example 1 where θ=0 (°). This response speed is shorter than those attained in Example 2 where θ=18 (°) and Examples 3 through 5 where θ=45 (°).

Example 7

A liquid crystal display device having the same structure as that of Example 6 except that an alignment film was subjected to the rubbing treatment for attaining a twist angle φ (°) of the nematic liquid crystal specified by the alignment film of 93 (°) was fabricated as a liquid crystal display device of Example 7. It is noted that a combination of θ=90 (°) and φ=93 (°) satisfies the formula (A) but does not satisfy the formula (B).

The contrast of this TN liquid crystal display device was found through measurement to be approximately 530. This value of the contrast is smaller than a value read in FIGS. 26 and 27, and this is probably because of factors other than the liquid crystal layer (such as polarizing devices, plastic beads and the like).

As is understood from comparison with Example 6, the contrast is improved by changing the twist angle φ from 90 (°) to 93 (°) when θ=90 (°).

Also, the response speed attained in turning the voltage off of this liquid crystal display device was shorter by approximately 25% than that attained in Example 1 where θ=0 (°). This response speed is shorter than those attained in Example 2 where θ=18 (°) and Examples 3 through 5 where θ=45 (°).

Example 8

A liquid crystal display device having the same structure as that of Example 6 except that an alignment film was subjected to the rubbing treatment for attaining a twist angle φ of the nematic liquid crystal specified by the alignment film of 96 (°) was fabricated as a liquid crystal display device of Example 8. It is noted that a combination of θ=90 (°) and φ=96 (°) satisfies both the formula (A) and the formula (B).

The contrast of this TN liquid crystal display device was found through measurement to be approximately 710. This value of the contrast is smaller than a value read in FIGS. 26 and 27, and this is probably because of factors other than the liquid crystal layer (such as polarizing devices, plastic beads and the like).

As is understood from comparison with Examples 6 and 7, the contrast is improved by changing the twist angle φ from 90 or 93 (°) to 96 (°) when θ=90 (°).

Also, the response speed attained in turning the voltage off of this liquid crystal display device was shorter by approximately 22% than that attained in Example 1 where θ=0 (°). This response speed is shorter than those attained in Example 2 where θ=18 (°) and Examples 3 through 5 where θ=45 (°).

Example 9

A liquid crystal display device having the same structure as that of Example 6 except that an alignment film was subjected to the rubbing treatment for attaining a twist angle φ of the nematic liquid crystal specified by the alignment film of 100 (°) was fabricated as a liquid crystal display device of Example 9. It is noted that a combination of θ=90 (°) and φ=100 (°) satisfies the formula (A) but does not satisfy the formula (B).

The contrast of this TN liquid crystal display device was found through measurement to be approximately 480. This value of the contrast is smaller than a value read in FIGS. 26 and 27, and this is probably because of factors other than the liquid crystal layer (such as polarizing devices, plastic beads and the like).

As is understood from comparison with Example 6, the contrast is improved by changing the twist angle φ from 90 (°) to 100 (°) when θ=90 (°). Also, as is understood from comparison with Examples 7 and 8, the contrast is lowered by changing the twist angle φ from 93 or 96 (°) to 100 (°) when θ=90 (°)

Also, the response speed attained in turning the voltage off of this liquid crystal display device was shorter by approximately 20% than that attained in Example 1 where θ=0 (°). This response speed is shorter than those attained in Example 2 where θ=18 (°) and Examples 3 through 5 where θ=45 (°).

Example 10

A liquid crystal display device having the same structure as that of Example 1 except that a chiral dopant (S-811: manufactured by Merck) was added to the liquid crystal layer for attaining a twist pitch (natural chiral pitch) p (μm) peculiar to the material of the nematic liquid crystal of 8 (μm), namely, for attaining a twist angle θ (°) peculiar to the nematic liquid crystal of 135 (°) on the basis of θ=360·d/p (°), was fabricated as a liquid crystal display device of Example 10. It is noted that a combination of θ=135 (°) and φ=90 (°) satisfies neither the formula (A) nor the formula (B).

The contrast of this TN liquid crystal display device was found through measurement to be approximately 220. This value of the contrast is smaller than a value read in FIGS. 26 and 27, and this is probably because of factors other than the liquid crystal layer (such as polarizing devices, plastic beads and the like).

As is understood from comparison with Examples 1, 2, 3 and 6, the contrast is lowered by increasing the twist angle θ (°).

Also, the response speed attained in turning the voltage off of this liquid crystal display device was shorter by approximately 39% than that attained in Example 1 where θ=0 (°). This response speed is shorter than those attained in Example 2 where θ=18 (°), Examples 3 through 5 where θ=45 (°) and Examples 6 through 9 where θ=90 (°)

Example 11

A liquid crystal display device having the same structure as that of Example 10 except that an alignment film was subjected to the rubbing treatment for attaining a twist angle φ of the nematic liquid crystal specified by the alignment film of 96 (°) was fabricated as a liquid crystal display device of Example 11. It is noted that a combination of θ=135 (°) and φ=96 (°) satisfies the formula (A) but does not satisfy the formula (B).

The contrast of this TN liquid crystal display device was found through measurement to be approximately 500. This value of the contrast is smaller than a value read in FIGS. 26 and 27, and this is probably because of factors other than the liquid crystal layer (such as polarizing devices, plastic beads and the like).

As is understood from comparison with Example 10, the contrast is improved by changing the twist angle φ from 90 (°) to 96 (°) when θ=135 (°).

Also, the response speed attained in turning the voltage off of this liquid crystal display device was shorter by approximately 34% than that attained in Example 1 where θ=0 (°). This response speed is shorter than those attained in Example 2 where θ=18 (°), Examples 3 through 5 where θ=45 (°) and Examples 6 through 9 where θ=90 (°)

Example 12

A liquid crystal display device having the same structure as that of Example 10 except that an alignment film was subjected to the rubbing treatment for attaining a twist angle φ of the nematic liquid crystal specified by the alignment film of 100 (°) was fabricated as a liquid crystal display device of Example 12. It is noted that a combination of θ=135 (°) and φ=100 (°) satisfies both the formula (A) and the formula (B).

The contrast of this TN liquid crystal display device was found through measurement to be approximately 670. This value of the contrast is smaller than a value read in FIGS. 26 and 27, and this is probably because of factors other than the liquid crystal layer (such as polarizing devices, plastic beads and the like).

As is understood from comparison with Examples 10 and 11, the contrast is improved by changing the twist angle φ from 90 or 96 (°) to 100 (°) when θ=135 (°).

Also, the response speed attained in turning the voltage off of this liquid crystal display device was shorter by approximately 32% than that attained in Example 1 where θ=0 (°). This response speed is shorter than those attained in Example 2 where θ=18 (°), Examples 3 through 5 where θ=45 (°) and Examples 6 through 9 where θ=90 (°).

Example 13

A liquid crystal display device having the same structure as that of Example 10 except that an alignment film was subjected to the rubbing treatment for attaining a twist angle φ of the nematic liquid crystal specified by the alignment film of 103 (°) was fabricated as a liquid crystal display device of Example 13. It is noted that a combination of θ=135 (°) and φ=103 (°) satisfies the formula (A) but does not satisfy the formula (B).

The contrast of this TN liquid crystal display device was found through measurement to be approximately 460. This value of the contrast is smaller than a value read in FIGS. 26 and 27, and this is probably because of factors other than the liquid crystal layer (such as polarizing devices, plastic beads and the like).

As is understood from comparison with Example 10, the contrast is improved by changing the twist angle φ from 90 (°) to 103 (°) when θ=135 (°). Also, as is understood from comparison with Examples 11 and 12, the contrast is improved by changing the twist angle φ from 96 or 100 (°) to 103 (°) when θ=135 (°).

Also, the response speed attained in turning the voltage off of this liquid crystal display device was shorter by approximately 31% than that attained in Example 1 where θ=0 (°). This response speed is shorter than those attained in Example 2 where θ=18 (°), Examples 3 through 5 where θ=45 (°) and Examples 6 through 9 where θ=90 (°)

Example 14

A liquid crystal display device having the same structure as that of Example 1 except that a chiral dopant (S-811: manufactured by Merck) was added to the liquid crystal layer for attaining a twist pitch (natural chiral pitch) p (μm) peculiar to the material of the nematic liquid crystal of 6 (μm), namely, for attaining a twist angle θ (°) peculiar to the nematic liquid crystal of 180 (°) on the basis of θ=360·d/p (°), was fabricated as a liquid crystal display device of Example 14. It is noted that a combination of θ=180 (°) and φ =90 (°) satisfies neither the formula (A) nor the formula (B).

The contrast of this TN liquid crystal display device was found through measurement to be approximately 190. This value of the contrast is smaller than a value read in FIGS. 26 and 27, and this is probably because of factors other than the liquid crystal layer (such as polarizing devices, plastic beads and the like).

As is understood from comparison with Examples 1, 2, 3, 6 and 10, the contrast is lowered by increasing the twist angle θ (°).

Also, the response speed attained in turning the voltage off of this liquid crystal display device was shorter by approximately 47% than that attained in Example 1 where θ=0 (°). This response speed is shorter than those attained in Example 2 where θ=18 (°), Examples 3 through 5 where θ=45 (°), Examples 6 through 9 where θ=90 (°) and Examples 10 through 13 where θ=135 (°).

Example 15

A liquid crystal display device having the same structure as that of Example 14 except that an alignment film was subjected to the rubbing treatment for attaining a twist angle φ of the nematic liquid crystal specified by the alignment film of 100 (°) was fabricated as a liquid crystal display device of Example 15. It is noted that a combination of θ=180 (°) and φ=100 (°) satisfies the formula (A) but does not satisfy the formula (B).

The contrast of this TN liquid crystal display device was found through measurement to be approximately 510. This value of the contrast is smaller than a value read in FIGS. 26 and 27, and this is probably because of factors other than the liquid crystal layer (such as polarizing devices, plastic beads and the like).

As is understood from comparison with Example 14, the contrast is improved by changing the twist angle φ from 90 (°) to 100 (°) when θ=180 (°).

Also, the response speed attained in turning the voltage off of this liquid crystal display device was shorter by approximately 42% than that attained in Example 1 where θ=0 (°). This response speed is shorter than those attained in Example 2 where θ=18 (°), Examples 3 through 5 where θ=45 (°), Examples 6 through 9 where θ=90 (°) and Examples 10 through 13 where θ=130 (°).

Example 16

A liquid crystal display device having the same structure as that of Example 14 except that an alignment film was subjected to the rubbing treatment for attaining a twist angle φ of the nematic liquid crystal specified by the alignment film of 103 (°) was fabricated as a liquid crystal display device of Example 16. It is noted that a combination of θ=180 (°) and φ=103 (°) satisfies both the formula (A) and the formula (B).

The contrast of this TN liquid crystal display device was found through measurement to be approximately 700. This value of the contrast is smaller than a value read in FIGS. 26 and 27, and this is probably because of factors other than the liquid crystal layer (such as polarizing devices, plastic beads and the like).

As is understood from comparison with Examples 14 and 15, the contrast is improved by changing the twist angle φ from 90 or 100 (°) to 103 (°) when θ=180 (°).

Also, the response speed attained in turning the voltage off of this liquid crystal display device was shorter by approximately 39% than that attained in Example 1 where θ=0 (°). This response speed is shorter than those attained in Example 2 where θ=18 (°), Examples 3 through 5 where θ=45 (°), Examples 6 through 9 where θ=90 (°) and Examples 10 through 13 where θ=135 (°).

Example 17

A liquid crystal display device having the same structure as that of Example 14 except that an alignment film was subjected to the rubbing treatment for attaining a twist angle φ of the nematic liquid crystal specified by the alignment film of 107 (°) was fabricated as a liquid crystal display device of Example 17. It is noted that a combination of θ=180 (°) and φ=107 (°) satisfies the formula (A) but does not satisfy the formula (B).

The contrast of this TN liquid crystal display device was found through measurement to be approximately 470. This value of the contrast is smaller than a value read in FIGS. 26 and 27, and this is probably because of factors other than the liquid crystal layer (such as polarizing devices, plastic beads and the like).

As is understood from comparison with Example 14, the contrast is improved by changing the twist angle φ from 90 (°) to 107 (°) when θ=180 (°). Also, as is understood from comparison with Examples 15 and 16, the contrast is lowered by changing the twist angle φ from 100 or 103 (°) to 107 (°) when θ=180 (°).

Also, the response speed attained in turning the voltage off of this liquid crystal display device was shorter by approximately 38% than that attained in Example 1 where θ=0 (°). This response speed is shorter than those attained in Example 2 where θ=18 (°), Examples 3 through 5 where θ=45 (°), Examples 6 through 9 where θ=90 (°) and Examples 10 through 13 where θ=135 (°).

Experiment 3

Method for Experiment

In order to examine the relationship between the rotational viscosity $\gamma_1$ of liquid crystal and the response speed $\tau_d$ attained in turning the voltage off, simulation was performed on TN liquid crystal display devices.

In the simulation, parameters of the liquid crystal were set as follows: the dielectric anisotropy $\Delta\epsilon=14$; the refractive index anisotropy $\Delta n=0.17$ (at a wavelength of 550 nm); the spread elastic coefficient K11=11 (pN); the twist elastic coefficient K22=6 (pN); and the bend elastic coefficient K33=13 (pN).

Also, parameters of the liquid crystal display device were set as follows: the cell gap d of a liquid crystal layer=2.8 (μm); and the pre-tilt angle=3 (°). Polarizing devices were set to have their polarization directions orthogonal to each other with the liquid crystal layer sandwiched therebetween. The wavelength employed for calculation was 550 nm.

Under the aforementioned setting, the response speeds τd (ms) attained when the rotational viscosity $\gamma_1$ (Pa·s) was set to 0.12, 0.10 and 0.08 respectively with the twist angle θ (°) set to 18, 45, 90, 135 and 180 and the twist angle φ (°) set to 0.075×θ+90 were obtained.

Result of Experiment

Table 2 shows the response speed $\tau_d$ obtained at each twisted angle θ when the rotational viscosity $\gamma_1$ was respectively set.

TABLE 2

| θ(°) | 18 | 45 | 90 | 135 |
|---|---|---|---|---|
| When $\gamma_1$ = 0.12 | | | | |
| $\tau_d$ (ms) | 10.8 | 10.0 | 9.2 | 8.5 |
| When $\gamma_1$ = 0.10 | | | | |
| $\tau_d$ (ms) | 9.0 | 8.4 | 7.6 | 6.9 |
| When $\gamma_1$ = 0.08 | | | | |
| $\tau_d$ (ms) | 7.2 | 6.7 | 6.1 | 5.5 |

As is understood from Table 2, in the case where the twist angle θ (°) is set to 45, 90 or 135 and the twist angle φ (°) is set in accordance with φ=0.075×θ+90, when the rotational viscosity $\gamma_1$ (Pa·s) is set to satisfy $\gamma_1 \leq 0.1$, the response speed $\tau_d$ (ms) can satisfy $\tau_d \leq 8.4$ (ms), and thus, the response speed attained in turning the voltage off can be increased.

Experiment 4

Liquid crystal display devices according to the following examples each having a similar structure to that of the above-described embodiment were fabricated, so as to measure the response speeds $\tau_d$ (ms) thereof attained in turning the voltage off (in reducing a voltage of 4.5 V to a voltage of 0 V).

Example 18

A liquid crystal display device in which a nematic liquid crystal material having physical property parameters equivalent to those set in the simulation of Experiment 3 and having rotational viscosity $\gamma_1$ (Pa·s) at a temperature of 40° C. of 0.11 (Pa·s) was used, a cell gap d (μm) of a liquid crystal layer was 2.8 (μm), a chiral dopant (S-811: manufactured by Merck) was added to the liquid crystal layer for attaining a twist pitch (natural chiral pitch) p (μm) peculiar to the material of the nematic liquid crystal of 22.4 (μm), namely, for attaining a twist angle θ (°) peculiar to the nematic liquid crystal of 45 (°) on the basis of θ=360·d/p (°), and an alignment film was subjected to the rubbing treatment for attaining a twist angle φ (°) specified by the alignment film of 93 (°) was fabricated as a liquid crystal display device of Example 18. It is noted that a combination of θ=45 (°) and φ=93 (°) satisfies both the formula (A) and the formula (B).

The response speed $\tau_d$ (ms) of this liquid crystal display device attained in turning the voltage off at a temperature of 40° C. was found through measurement to be approximately 9 ms.

Example 19

A liquid crystal display device having the same structure as that of Example 18 except that nematic liquid crystal having rotational viscosity $\gamma_1$ (Pa·s) at a temperature of 40° C. of 0.09 (Pa·s) was used was fabricated as a liquid crystal display device of Example 19.

The response speed $\tau_d$ (ms) of this liquid crystal display device attained in turning the voltage off at a temperature of 40° C. was found through measurement to be slightly lower than 8 ms.

Example 20

A liquid crystal display device in which a nematic liquid crystal material having physical property parameters equivalent to those set in the simulation of Experiment 3 and having rotational viscosity $\gamma_1$ (Pa·s) at a temperature of 40° C. of 0.11 (Pa·s) was used, a cell gap d (μm) of a liquid crystal layer was 2.8 (μm), a chiral dopant (S-811: manufactured by Merck) was added to the liquid crystal layer for attaining a twist pitch (natural chiral pitch) p (μm) peculiar to the material of the nematic liquid crystal of 11.2 (μm), namely, for attaining a twist angle θ (°) peculiar to the nematic liquid crystal of 90 (°) on the basis of θ=360·d/p (°), and an alignment film was subjected to the rubbing treatment for attaining a twist angle φ (°) specified by the alignment film of 96 (°) was fabricated as a liquid crystal display device of Example 20. It is noted that a combination of θ=90 (°) and φ=96 (°) satisfies both the formula (A) and the formula (B).

The response speed $\tau_d$ (ms) of this liquid crystal display device attained in turning the voltage off at a temperature of 40° C. was found through measurement to be approximately 8 ms.

Example 21

A liquid crystal display device having the same structure as that of Example 20 except that nematic liquid crystal having rotational viscosity $\gamma_1$ (Pa·s) at a temperature of 40° C. of 0.09 (Pa·s) was used was fabricated as a liquid crystal display device of Example 21.

The response speed $\tau_d$ (ms) of this liquid crystal display device attained in turning the voltage off at a temperature of 40° C. was found through measurement to be approximately 7 ms.

Example 22

A liquid crystal display device in which a nematic liquid crystal material having physical property parameters equivalent to those set in the simulation of Experiment 3 and having rotational viscosity $\gamma_1$ (Pa·s) at a temperature of 40° C. of 0.11 (Pa·s) was used, a cell gap d (μm) of a liquid crystal layer was 2.8 (μm), a chiral dopant (S-811: manufactured by Merck) was added to the liquid crystal layer for attaining a twist pitch (natural chiral pitch) p (μm) peculiar to the material of the nematic liquid crystal of 7.5 (μm), namely, for attaining a twist angle θ (°) peculiar to the nematic liquid crystal of 135 (°) on the basis of θ=360·d/p (°), and an alignment film was subjected to the rubbing treatment for attaining a twist angle φ (°) specified by the alignment film of 100 (°) was fabricated as a liquid crystal display device of Example 22. It is noted that a combination of θ=135 (°) and φ=100 (°) satisfies both the formula (A) and the formula (B).

The response speed $\tau_d$ (ms) of this liquid crystal display device attained in turning the voltage off at a temperature of 40° C. was found through measurement to be approximately 8 ms.

Example 23

A liquid crystal display device having the same structure as that of Example 22 except that nematic liquid crystal having rotational viscosity $\gamma_1$ (Pa·s) at a temperature of 40° C. of 0.09 (Pa·s) was used was fabricated as a liquid crystal display device of Example 23.

The response speed $\tau_d$ (ms) of this liquid crystal display device attained in turning the voltage off at a temperature of 40° C. was found through measurement to be approximately 6 ms.

Through comparison between Examples 18 and 19, Examples 20 and 21 and Examples 22 and 23, it is understood that the response speed $\tau_d$ (ms) attained in turning the voltage off at a temperature of 40° C. is higher in a liquid crystal display device using nematic liquid crystal having rotational viscosity $\gamma_1$ (Pa·s) at a temperature of 40° C. of 0.09 (Pa·s) than in a liquid crystal display device using nematic liquid crystal having rotational viscosity $\gamma_1$ (Pa·s) at a temperature of 40° C. of 0.11 (Pa·s).

INDUSTRIAL APPLICABILITY

According to an image shifting device of the present invention, the response speed of liquid crystal attained when the applied voltage is changed from an on-state to an off-state can be increased, so that an image can be shifted at a high frequency while suppressing occurrence of a double image. By using such an image shifting device, an image display apparatus for displaying an image with high resolution is provided.

Also, according to an embodiment of the present invention, a liquid crystal display device in which lowering of a contrast ratio derived from a spacer can be suppressed and bright display can be produced at a high aperture ratio is provided.

Since the liquid crystal display device can produce bright display at a high contrast ratio, it can be suitably used in a projection image display apparatus.

Furthermore, since a twist angle φ (°) specified by an alignment film of nematic liquid crystal of a liquid crystal layer is set to fall within a given range in accordance with the relationship with a twist angle θ (°) peculiar to the material of the nematic liquid crystal, high contrast can be obtained without increasing a driving voltage. In particular, even in the case where the response speed attained in turning the voltage off is improved by increasing the twist angle θ (°) peculiar to the material of the nematic liquid crystal, high contrast can be obtained without increasing the driving voltage by setting the twist angle φ (°) specified by the alignment film within a given range.

The invention claimed is:

1. An image shifting device comprising:
at least one image shifting part for periodically shifting a position of an optical axis,
wherein the image shifting part includes:
a liquid crystal cell for switching a polarization direction of light between first and second directions orthogonal to each other in accordance with first and second levels of an applied voltage; and
a birefringent device positioned to receive light transmitted by the liquid crystal cell and having different refractive indexes depending upon the polarization direction of the light, and
a liquid crystal layer included in the liquid crystal cell is made of a TN liquid crystal layer that satisfies a relationship formula of 0.25<d/p<1, wherein p indicates a natural pitch length and d indicates a cell gap, and is disposed to be twisted by 90 ° in the liquid crystal cell.

2. The image shifting device of claim 1,
wherein the natural pitch length p of the liquid crystal layer is adjusted by adding a chiral agent.

3. The image shifting device of claim 1,
wherein the liquid crystal layer satisfies a relationship formula of 0.5<d/p.

4. The image shifting device of claim 3,
wherein the liquid crystal layer satisfies a relationship formula of d/p<0.75.

5. The image shifting device of claim 3,
wherein the liquid crystal layer has a pre-tilt angle adjusted to be smaller than 5°.

6. The image shifting device of claim 1,
wherein the image shifting part is plural in number.

7. An image shifting device module comprising:
the image shifting device according to claim 1; and
a driving circuit for supplying a voltage to the liquid crystal cell of the image shifting device,
wherein the driving circuit changes the voltage in synchronization with switching timing of an image to be shifted.

8. The image shifting device module of claim 7,
wherein the driving circuit applies a voltage of 7 V or more through substantially whole of the liquid crystal layer included in the liquid crystal cell of the image shifting device in a selected period.

9. The image shifting device module of claim 8,
wherein the selected period has a length not shorter than a sub-field period of an image.

10. An image display apparatus comprising:
an image display part for displaying an image; and
the image shifting device according to claim 1,
wherein light outgoing from the image display part is shifted by using the image shifting device in synchronization with display performed by the image display part.

11. The image display apparatus of claim 10, further comprising a driving circuit for supplying a voltage to the liquid crystal cell of the image shifting device.

12. The image display apparatus of claim 11,
wherein the driving circuit applies a voltage of 7 V or more through substantially whole of the liquid crystal layer included in the liquid crystal cell of the image shifting device in a selected period.

13. The image display apparatus of claim 12,
wherein the selected period has a length not shorter than a sub-field period of an image.

14. The image display apparatus of claim 10,
wherein the light outgoing from the image display part and entering the image shifting device is linearly polarized light.

15. The image display apparatus of claim 10,
wherein outputs of pixels producing the image are superimposed in a time division manner.

16. An image display apparatus comprising:
a light source;
an image display panel having a plurality of pixel regions each capable of modulating light;
light controlling means for collecting light from the light source in a corresponding pixel region out of the plurality of pixel regions in accordance with a wave range of the light;
an optical system for forming an image on a projection plane by using the light having been modulated by the image display panel;
a circuit for creating data of a plurality of sub-frame images on the basis of data of each frame image included in the image and allowing the image display panel to display the plurality of sub-frame images in a time division manner; and
the image shifting device according to any of claims 1 through 6 for shifting, on the projection plane, a sub-frame image selected from the plurality of sub-frame images displayed by the image display panel,
wherein one region on the projection plane is irradiated successively with light of different wave ranges having been modulated by different pixel regions of the image display panel.

17. An image shifting device comprising:
at least one image shifting part for periodically shifting a position of an optical axis,
wherein the image shifting part includes:
a liquid crystal cell for switching a polarization direction of light between two directions orthogonal to each other in accordance with high/low level of an applied voltage; and
a birefringent device with different refractive indexes depending upon the polarization direction of the light, and
a liquid crystal layer included in the liquid crystal cell is made of a TN liquid crystal layer that satisfies a relationship formula of 0.25<d/p<1, wherein p indicates a natural pitch length and d indicates a cell gap, and is disposed to be twisted by 90° in the liquid crystal cell.

* * * * *